(12) United States Patent
Komatsu et al.

(10) Patent No.: US 10,647,287 B2
(45) Date of Patent: May 12, 2020

(54) AIRBAG

(71) Applicant: TOYODA GOSEI CO., LTD., Kiyosu-shi, Aichi-ken (JP)

(72) Inventors: Takanori Komatsu, Kiyosu (JP); Wataru Miura, Kiyosu (JP); Hiroyuki Nakanishi, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 99 days.

(21) Appl. No.: 15/911,473

(22) Filed: Mar. 5, 2018

(65) Prior Publication Data
US 2018/0281742 A1 Oct. 4, 2018

(30) Foreign Application Priority Data

Mar. 31, 2017 (JP) .................................. 2017-070915

(51) Int. Cl.
| | |
|---|---|
| *B60R 21/2338* | (2011.01) |
| *B60R 21/239* | (2006.01) |
| *B60R 21/233* | (2006.01) |
| *B60R 21/205* | (2011.01) |

(52) U.S. Cl.
CPC ........ *B60R 21/2338* (2013.01); *B60R 21/205* (2013.01); *B60R 21/233* (2013.01); *B60R 21/239* (2013.01); *B60R 2021/2395* (2013.01); *B60R 2021/23308* (2013.01);
(Continued)

(58) Field of Classification Search
CPC ........... B60R 2021/23382; B60R 2021/23384; B60R 2021/2395; B60R 21/205; B60R 21/2338; B60R 21/239; B60R 2021/23388; B60R 2021/23324; B60R 2021/23308; B60R 21/233
See application file for complete search history.

(56) References Cited

U.S. PATENT DOCUMENTS

| | | | | |
|---|---|---|---|---|
| 6,648,371 | B2* | 11/2003 | Vendely ................ | B60R 21/217 280/739 |
| 6,832,778 | B2* | 12/2004 | Pinsenschaum ...... | B60R 21/233 280/739 |
| 7,328,915 | B2 | 2/2008 | Smith et al. | |

(Continued)

FOREIGN PATENT DOCUMENTS

| | | |
|---|---|---|
| JP | 2008-207579 A | 9/2008 |
| JP | 2016-013712 A | 1/2016 |
| JP | 2016-026943 A | 2/2016 |

*Primary Examiner* — Laura Freedman
(74) *Attorney, Agent, or Firm* — Posz Law Group, PLC

(57) ABSTRACT

An airbag includes an internal pressure adjusting mechanism, including: a tether arranged in a bag part; a long side part; and a short side part; and adjusting an exhaust of the inflation gas: to be in an exhaust mode in which the exhaust is facilitated when the tether is loosened; and to be in an exhaust suppression mode in which the exhaust is suppressed when the tether is stretched. In a state where the tether is loosened during the exhaust mode, facing edge parts of the long side part and the short side part are separable. In a state where the tether is stretched during the exhaust suppression mode, the facing edge part of the long side part and a root side part are inflated around the short side part and a leading edge side part contacts a back surface side of the short side part.

3 Claims, 11 Drawing Sheets

(52) U.S. Cl.
CPC .............. *B60R 2021/23324* (2013.01); *B60R 2021/23384* (2013.01); *B60R 2021/23388* (2013.01)

(56) References Cited

U.S. PATENT DOCUMENTS

| | | | | |
|---|---|---|---|---|
| 7,568,729 B2* | 8/2009 | Schnieder | ........... | B60R 21/2338 280/736 |
| 7,726,685 B2* | 6/2010 | Abe | ................ | B60R 21/2338 280/736 |
| 7,810,841 B2* | 10/2010 | Fukawatase | ......... | B60R 21/239 280/739 |
| 7,837,228 B2* | 11/2010 | Abe | ..................... | B60R 21/231 280/743.1 |
| 7,992,897 B2* | 8/2011 | Sekino | ................ | B60R 21/231 280/729 |
| 8,322,748 B2* | 12/2012 | Abe | .................... | B60R 21/2338 280/730.2 |
| 8,534,704 B2* | 9/2013 | Fischer | ................. | B60R 21/239 280/736 |
| 8,646,808 B2* | 2/2014 | Williams | .............. | B60R 21/239 280/739 |
| 8,746,736 B2* | 6/2014 | Mendez | ................ | B60R 21/239 280/736 |
| 8,882,143 B2* | 11/2014 | Williams | .............. | B60R 21/239 280/739 |
| 8,955,878 B2* | 2/2015 | Jang | ..................... | B60R 21/239 280/736 |
| 9,272,685 B2* | 3/2016 | Fischer | ................. | B60R 21/2338 |
| 9,327,674 B2* | 5/2016 | Fischer | ................. | B60R 21/2338 |
| 9,428,141 B2* | 8/2016 | Kwon | .................. | B60R 21/239 |
| 10,029,645 B2* | 7/2018 | Aranzulla | ............ | B60R 21/239 |
| 10,131,316 B2* | 11/2018 | Aranzulla | ............ | B60R 21/239 |
| 2015/0375711 A1 | 12/2015 | Umehara et al. | | |

\* cited by examiner

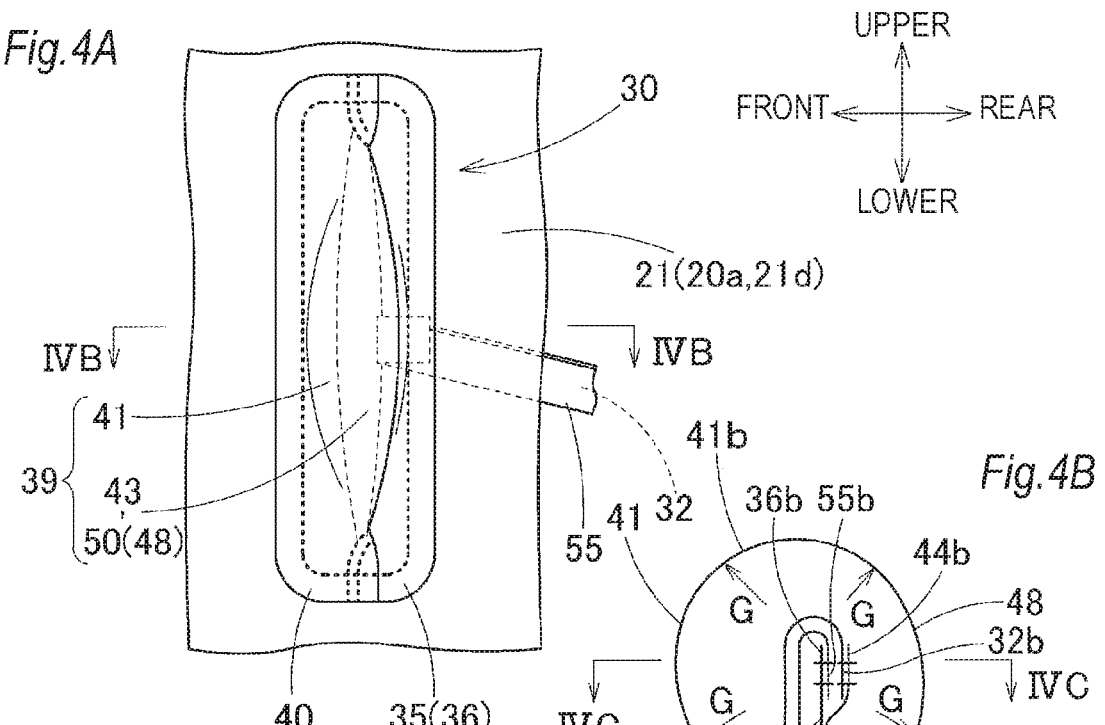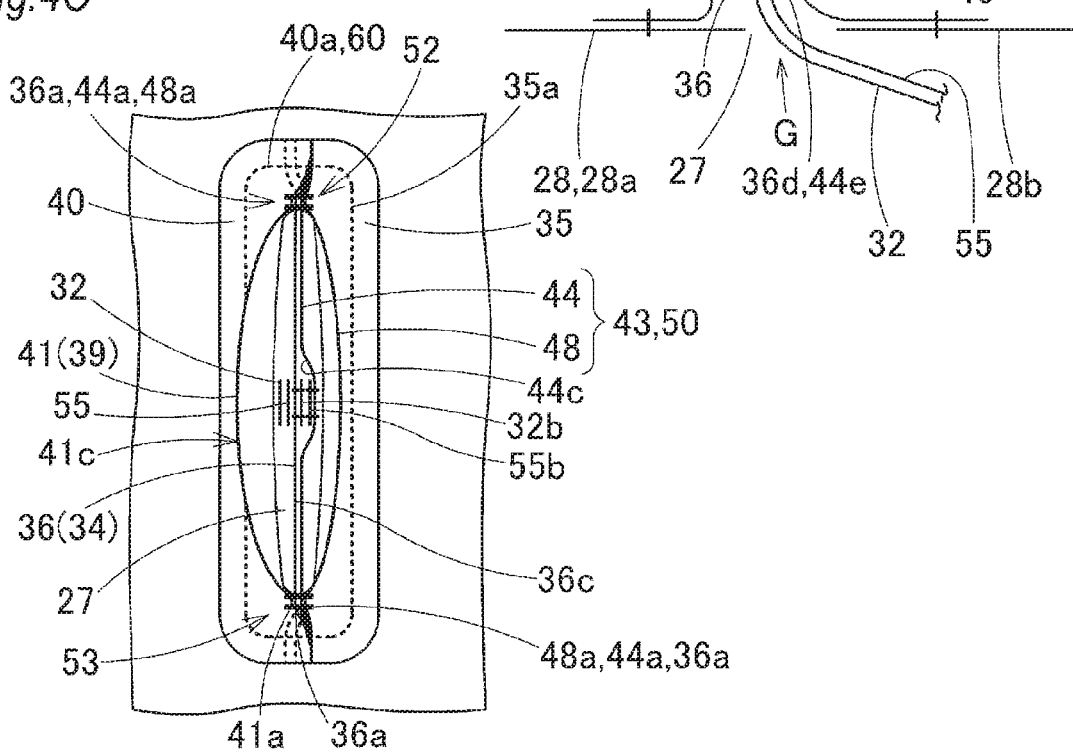

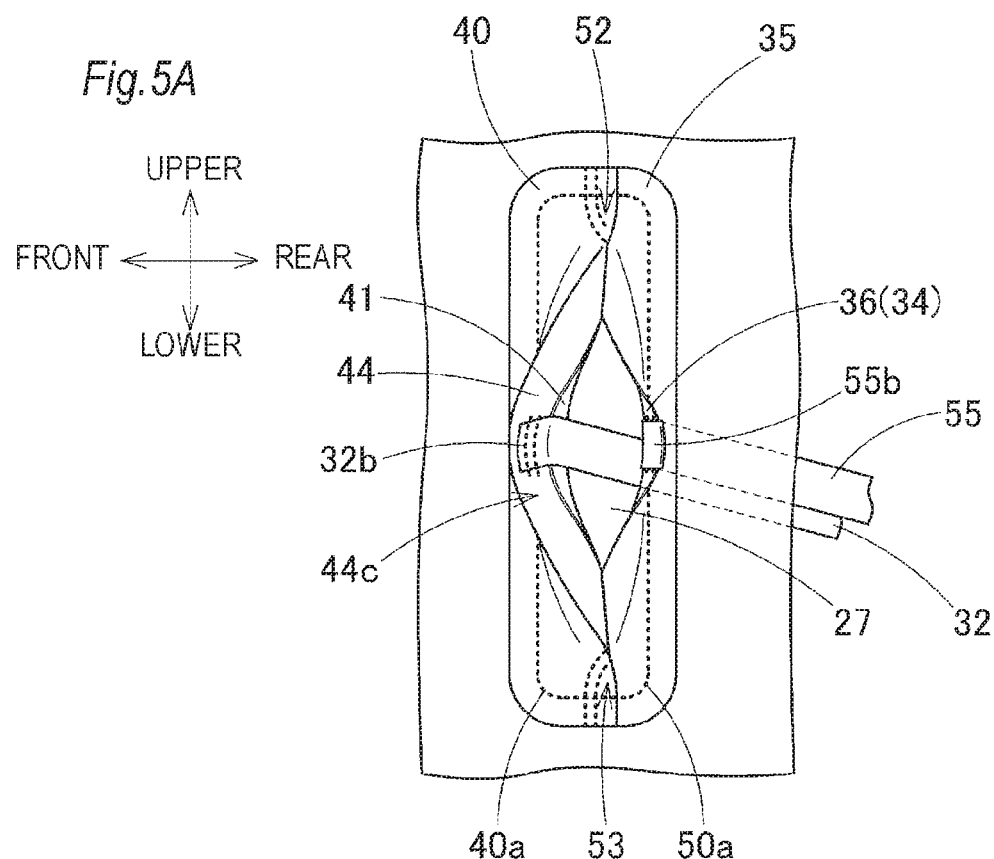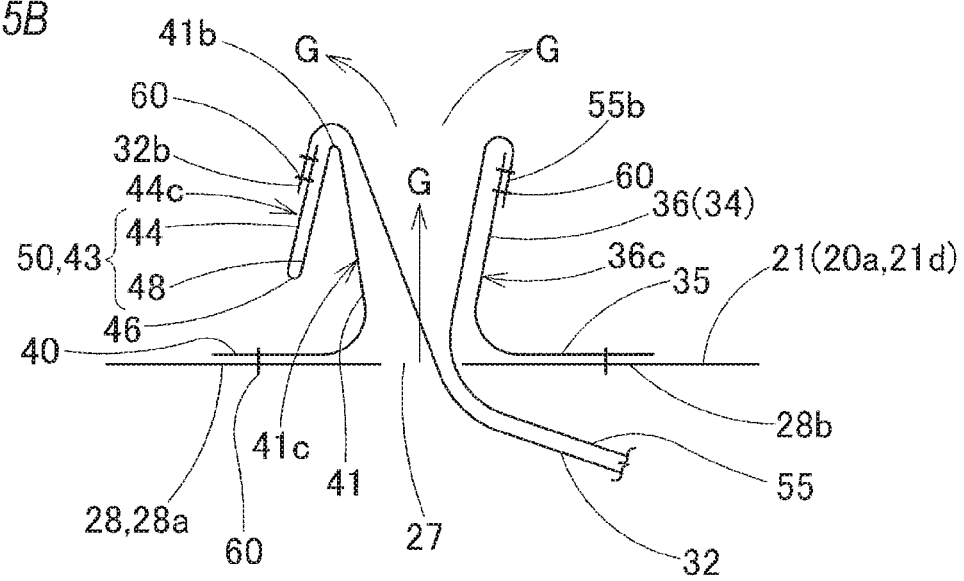

AIRBAG

CROSS-REFERENCE TO RELATED APPLICATION(S)

This application is based upon and claims the benefit of priority from prior Japanese patent application No. 2017-070915, filed on Mar. 31, 2017, the entire contents of which are incorporated herein by reference.

BACKGROUND

The present invention relates to an airbag of an airbag device mounted in a vehicle, and particularly to an airbag which includes an internal pressure adjusting mechanism which can adjust an internal pressure of the airbag by exhausting a flowed-in inflation gas or by suppressing the exhaust.

In the related art, an airbag of an airbag device is known which uses a tether in an internal pressure adjusting mechanism (for example, see JP-A-2008-207579 and U.S. Pat. No. 7,328,915). In the internal pressure adjusting mechanism, when the inflating airbag protrudes from a housing portion, and an occupant approaches the housing portion, the inflation gas is exhausted from an exhaust port of the internal pressure adjusting mechanism to suppress the internal pressure increase of the airbag and to prevent that the airbag strongly abuts on the approaching occupant. In addition, when the occupant is in a proper position where the occupant does not approach the housing portion, the exhaust of the inflation gas is suppressed such that the airbag is completely inflated rapidly. The internal pressure adjusting mechanism is configured such that the peripheral edge of the exhaust port provided in an inflating bag part is formed in a tube shape, and a predetermined length of the tether extending from the inside of the bag part is coupled with the tube portion.

In the internal pressure adjusting mechanism, when the bag part of the airbag is inflated in a state where the occupant approaches the housing portion, the bag part interferes with the occupant in a state where the tether is loosened before the inflation of the bag part is completed, the tether remains in the loosened state, and the tube portion of the exhaust port is maintained to be opened. For this reason, the inflation gas is exhausted from the opened exhaust port, and the inflation of the bag part is suppressed, so as to reduce the force that the bag part presses the approaching occupant. On the other hand, when the occupant is positioned in the proper position where the occupant does not approach the housing portion, the bag part of the airbag protrudes smoothly from the housing portion, so that the tether is stretched. For this reason, the tube portion of the peripheral edge of the exhaust port is stretched by the tether to enter into the bag part, and further the tube portion is crushed by the internal pressure of the bag part to close the exhaust port. Thus, the exhaust of the inflation gas from the exhaust port is suppressed so that the inflation of the bag part is completed rapidly.

However, the airbag in the related art is configured such that, in the state of the exhaust suppression mode, a cylindrical tube portion which is pulled in the bag part is crushed by the internal pressure of the bag part, so as to close the exhaust port. The crushed state indicates a state where the circumferential wall of the tube portion is gathered to the center side. Thus, an occurrence of a wrinkle cannot be avoided so as to be gathered to the center side, whereby the leakage of the inflation gas from the gap of the wrinkle cannot be prevented. Particularly, when the opening area of the tube portion is widened to maintain the stable exhaust mode, the length of the circumferential wall of the tube portion in the circumferential direction is further increased. Thus, during the exhaust suppression mode, the wrinkle which occurs when the tube portion is gathered to the center side is increased, so as to further promote a gas leakage. For this reason, in the configuration of the airbag in the related art, although the state is shifted to the exhaust suppression mode, the leakage of the inflation gas occurs. Thus, there is a problem in ensuring a stable exhaust suppression state of the exhaust suppression mode.

SUMMARY

The invention has been made to solve the above-described problem, and an object thereof is to provide an airbag in which a stable exhaust suppression state can be ensured during an exhaust suppression mode.

According to an aspect of the invention, there is provided an airbag including: a bag part which includes a circumferential wall formed of a flexible sheet material, and which is configured to be inflated by a flowing inflation gas; an exhaust port which is open in the circumferential wall so as to exhaust the inflation gas from the bag part; and an internal pressure adjusting mechanism which includes a tether arranged in the bag part, the tether formed of a flexible member and having a tip extending from an attaching base part, the tip coupled with a vicinity of a peripheral edge of the exhaust port, wherein the internal pressure adjusting mechanism is configured to adjust an exhaust of the inflation gas: to be in an exhaust mode in which the exhaust of the inflation gas from the exhaust port is facilitated when the tether is loosened; and to be in an exhaust suppression mode in which the exhaust of the inflation gas from the exhaust port is suppressed when the tether is stretched, the internal pressure adjusting mechanism includes: a pair of facing sheet parts which are arranged to extend respectively from both edges which face each other in the peripheral edge of the exhaust port on an outer peripheral surface side of the bag part, and which are formed of a flexible member; and the tether, the pair of facing sheet parts include facing edge parts which extend from the peripheral edge of the exhaust port in a belt shape to face each other with the exhaust port interposed therebetween, one of the pair of facing sheet parts is a long side part which includes an extending sheet part that extends from the facing edge part to be separated from the peripheral edge of the exhaust port and that is coupled with the tether at a tip side, the other of the pair of facing sheet parts is a short side part which includes the facing edge part, the extending sheet part of the long side part includes a folded portion which extends from the facing edge part of the long side part to cover a terminal of the facing edge part of the short side part and to pass over the facing edge part of the short side part, and which is arrangeable to be folded back to a back surface side, which is opposite to the exhaust port side, of the facing edge part of the short side part, the folded portion includes: a leading edge side part which is arrangeable to contact the back surface side of the facing edge part of the short side part, and which is coupled with the tip of the tether; and a root side part which is provided with a reversed part between the leading edge side part and the root side part, and which is connected from the leading edge side part to an end part of the facing edge part of the long side part, the long side part and the short side part are coupled with each other in both edges in a direction perpendicular to a facing direction of the facing edge parts in a state where the folded portion is arranged on the back surface side of the facing edge part of the short side part and the facing edge parts are overlapped, and a length dimension of the tether is set in such a manner that: in a state where the tether is loosened during the exhaust mode of the internal pressure adjusting mechanism, the tip of the tether is coupled with the leading edge side part such that the folded portion of the long side part is arranged on a back surface side, which is opposite to the exhaust port side, of the facing edge part of the long side part and the facing edge parts of the long side part and the short side part are separable; and in a state where the tether is stretched during the exhaust suppression mode of the internal pressure adjusting mechanism, the leading edge side part is stretched such that the facing edge part of the long side part and the root side part of the folded portion are inflated around the facing edge part of the short side part and the leading edge side part of the long side part is capable of press-contacting the back surface side of the facing edge part of the short side part.

BRIEF DESCRIPTION OF THE DRAWINGS

FIG. 4A is a schematic front view illustrating the peripheral edge of the exhaust port during an exhaust suppression mode of the airbag of FIG. 2, FIG. 4B is a schematic longitudinal sectional view at IVB-IVB line shown in FIG. 4A, and FIG. 4C is a schematic horizontal sectional view at IVC-IVC line shown in FIG. 4B;

FIGS. 5A and 5B are a schematic front view and a longitudinal sectional view schematically illustrating the peripheral edge of the exhaust port during the exhaust mode of the airbag of FIG. 2;

DETAILED DESCRIPTION OF EXEMPLARY EMBODIMENTS

Figure 1:
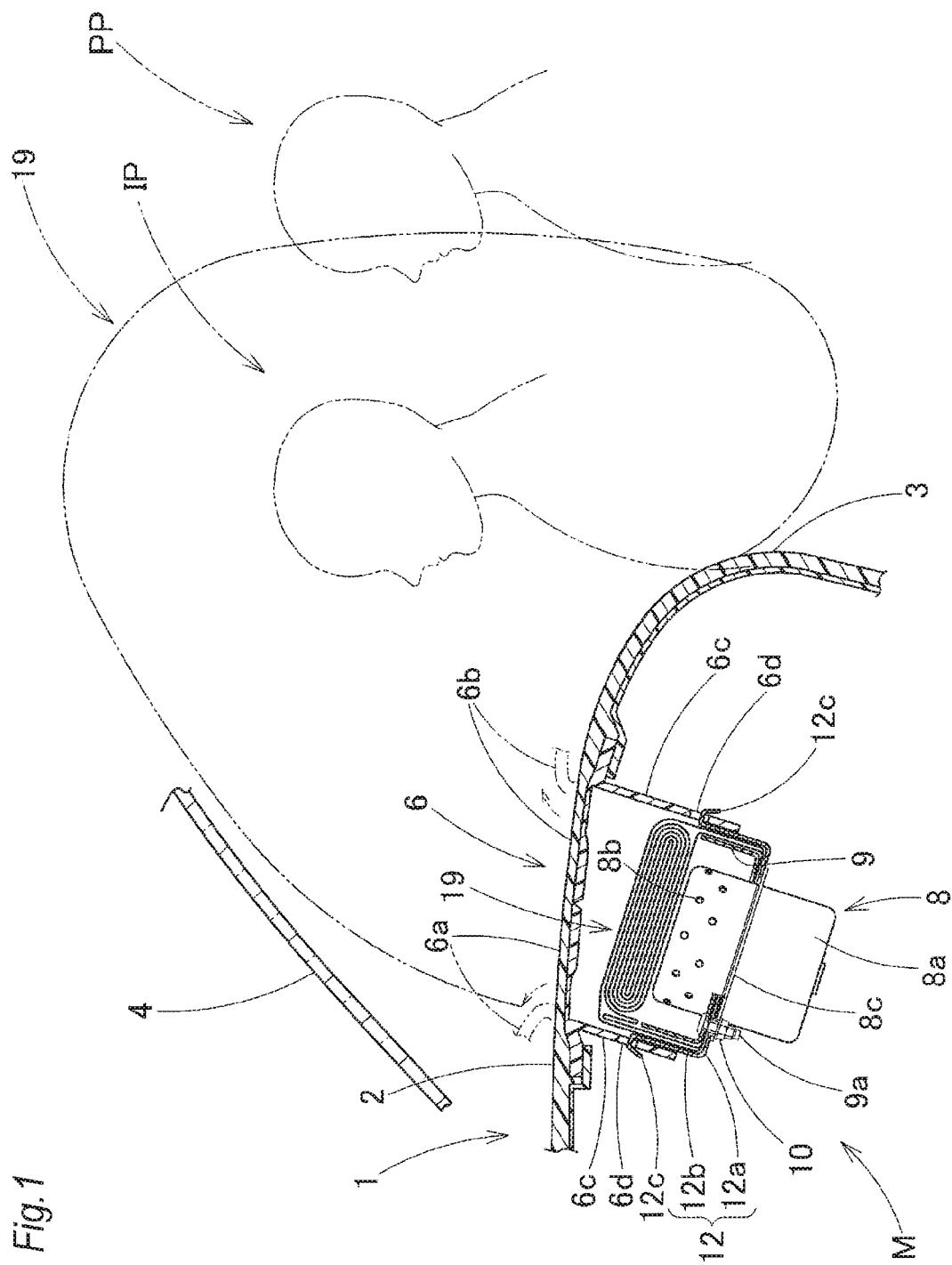
FIG. 1 is a longitudinal sectional view schematically illustrating a state where a passenger seat airbag device using an airbag of one embodiment according to the invention is mounted in a vehicle.

Hereinafter, one embodiment of the invention will be described on the basis of the drawings. As illustrated in FIG. 1, in the embodiment, the description will be given by adopting an airbag 19 used in a passenger seat airbag device M as an example. The passenger seat airbag device M is arranged on the front side of the passenger seat. As illustrated in FIG. 1, The passenger seat airbag device M is formed as a top-mounted type which is mounted inside an instrument panel (hereinafter, referred to as an "instrument panel") 1 on an upper surface 2 side under a windshield 4. The airbag device M includes a fold-up airbag 19, an inflator 8 which supplies an inflation gas to the airbag 19, a case 12 as a housing portion which houses and holds the airbag 19 and the inflator 8, a retainer 9 for attaching the airbag 19 and the inflator 8 in the case 12, and an airbag cover 6 which covers an upper side of the fold-up airbag 19.

The airbag cover 6 is formed integrally with the synthetic resin instrument panel 1 and has two pieces of door parts 6a and 6b which are pressed by the airbag 19 during deployment to be opened to both front and rear sides. In addition, a connection wall part 6c connected in the case 12 is formed around the door parts 6a and 6b in the airbag cover 6. A locking hole 6d for locking a locking claw 12c of the case 12 is formed in the connection wall part 6c.

The inflator 8 includes a substantially columnar main body part 8a having a plurality of gas discharge ports 8b and a flange part 8c for attaching the inflator 8 in the case 12.

The case 12 as the housing portion is formed of a sheet metal in a substantially rectangular parallelepiped shape having a rectangular opening on the upper end side. The case includes a substantially rectangular-plate bottom wall part 12a which attaches the inflator 8 by inserting from below, and a circumferential wall part 12b which extends upward from the outer peripheral edge of the bottom wall part 12a and locks the connection wall part 6c of the airbag cover 6. The locking claw 12c which is inserted to the locking hole 6d of the connection wall part 6c to lock the connection wall part 6c is formed in the upper end of the circumferential wall part 12b.

In the case of the embodiment, the airbag 19 and the inflator 8 are attached in the bottom wall part 12a of the case 12 when bolts 9a of the retainer 9 arranged in the airbag 19 as an attaching unit penetrate an attaching seat 22 of a peripheral edge of an inflow opening 23 (to be described) in the airbag 19, the bottom wall part 12a of the case 12, and the flange part 8c of the inflator 8 and are fastened by the nut 10. In addition, a bracket (not illustrated) connected on the body of the vehicle is provided in the bottom wall part 12a of the case 12.

Figure 2:
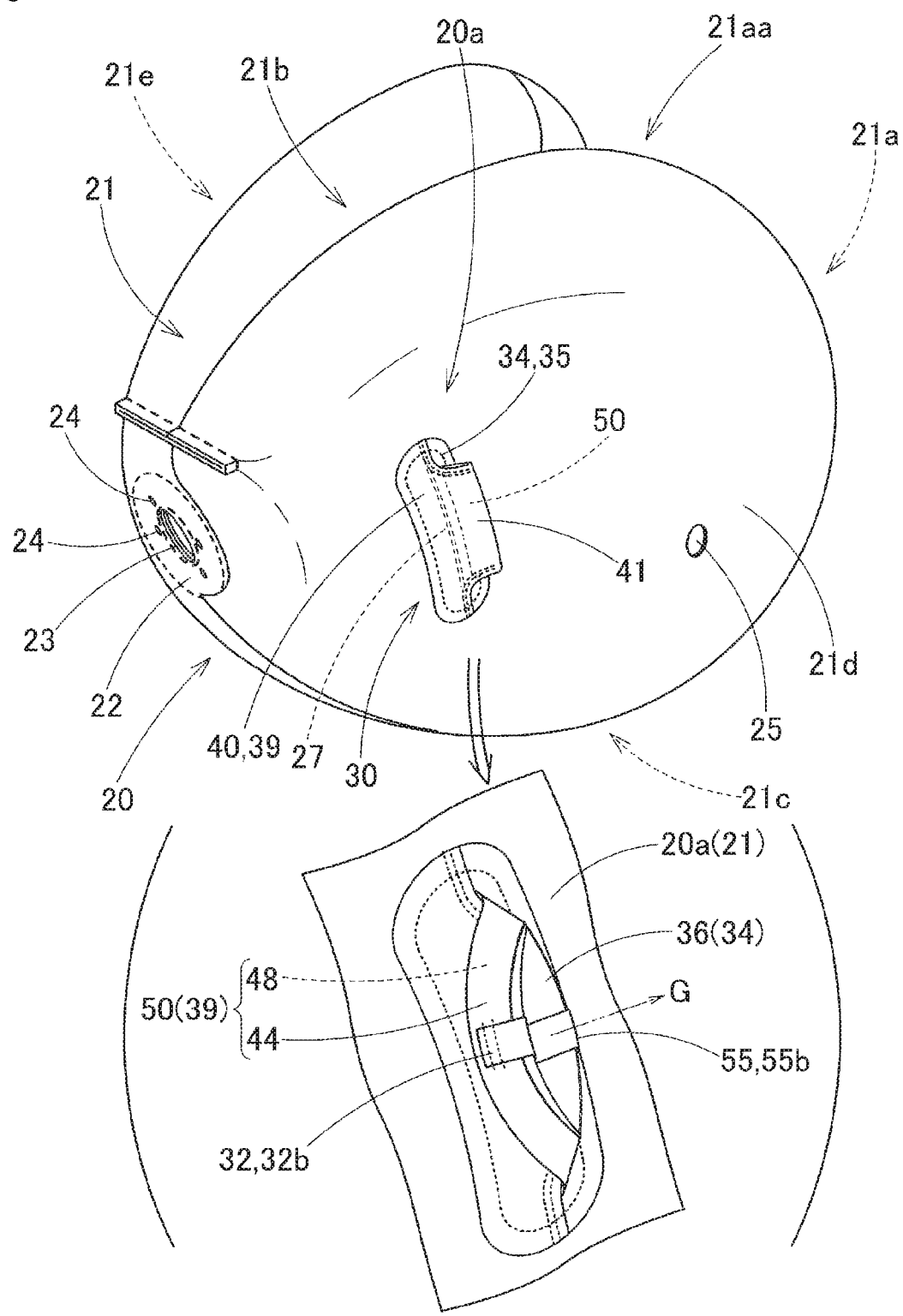
FIG. 2 is a perspective view schematically illustrating a state where the airbag of the embodiment is inflated as a single piece when viewed from a front side, and includes a partially enlarged perspective view of a peripheral edge of an exhaust port during an exhaust mode.
Figure 3:
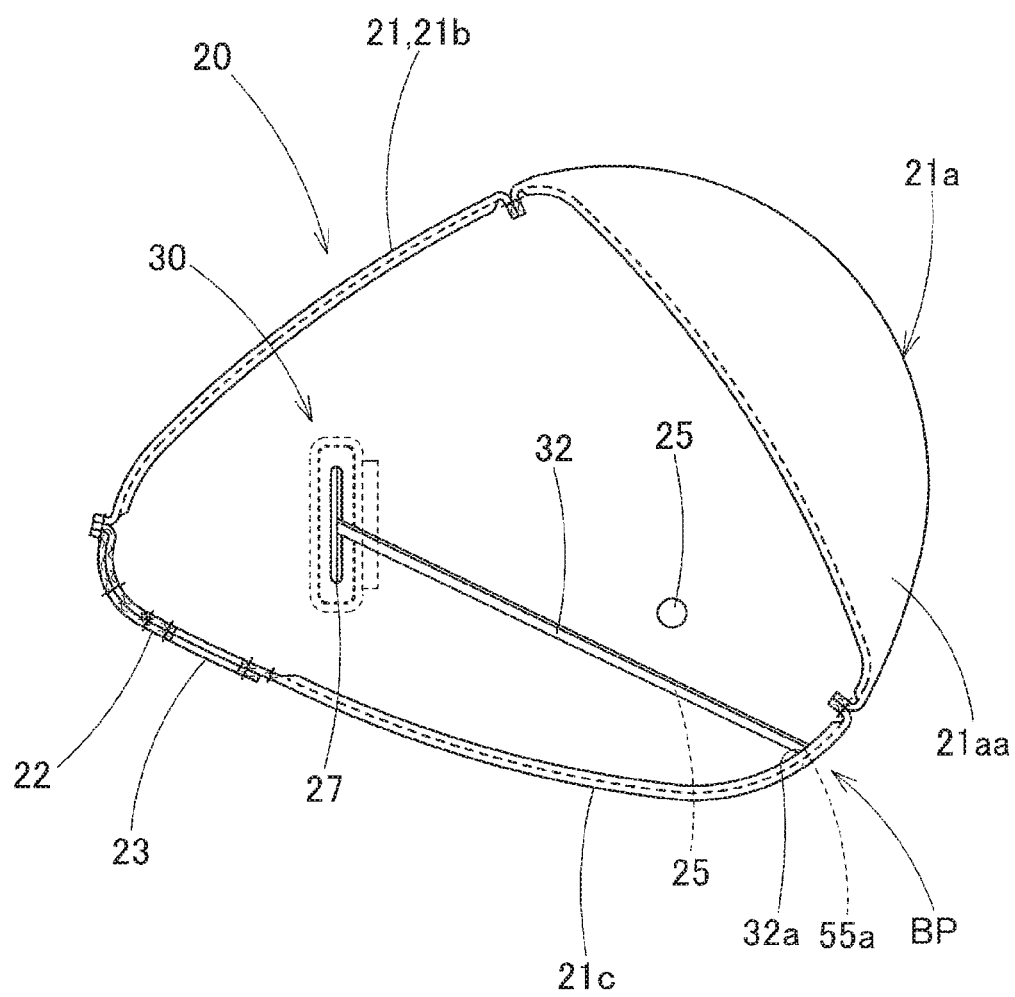
FIG. 3 is a longitudinal sectional view schematically illustrating the airbag of FIG. 2 in a front and rear direction.

As illustrated by a two-dot chain line of FIG. 1 or in FIGS. 2 and 3, the airbag 19 includes a substantially bag-shaped bag part 20 which is inflated by allowing the inflation gas to flow thereinto so as to be arranged such that a space between the upper surface 2 of the instrument panel 1 and the windshield 4 above the instrument panel 1 is closed during the inflation completion, an exhaust port 27 which is open in a circumferential wall 21 of the bag part 20 to exhaust the inflation gas G from the bag part 20, and an internal pressure adjusting mechanism 30 which adjusts whether to exhaust the inflation gas G from the exhaust port 27.

The bag part 20 includes the circumferential wall 21 which is made of a sheet material such as a polyamide woven fabric having flexibility. As illustrated in FIGS. 2 and 3, the shape at the time of completion of inflation is formed in a substantially quadrangular pyramid shape in which a top part is arranged on the front end side. The circumferential wall 21 at the time of completion of inflation includes a rear wall part 21a which is on the occupant side, and an upper wall part 21b, a lower wall part 21c, a left wall part 21d, and a right wall part 21e which extend to the front side from the upper, lower, left, and right sides of the peripheral edge of the rear wall part 21a. The inflow opening 23 which is open in a substantially circular shape to allow the inflation gas to flow therein is formed in a substantially center of the lower wall part 21c in a right and left direction in the vicinity of the front end during the inflation completion of the bag part 20. The peripheral edge of the inflow opening 23 is formed as the attaching seat 22 attached in the bottom wall part 12a of the case 12, and is formed with a plurality of (four in the case of the embodiment) attaching holes 24 in which the bolt 9a of the retainer 9 is inserted to be attached in the bottom wall part 12a of the case 12. Incidentally, in the case of the embodiment, the rear wall part 21a is arranged such that a recess part 21aa recessed to the front side is formed in the center in the right and left direction along the vertical direction.

The exhaust ports 27 are arranged on the font part side of the left and right of the left wall part 21d and right wall part 21e, and are open in a narrow slit shape formed to extend the vertical direction.

Incidentally, additionally, vent holes 25 which exhaust the excessive inflation gas G after the inflation completion of the bag part 20 are open on the rear part side of the left wall part 21d and the right wall part 21e of the circumferential wall 21.

The internal pressure adjusting mechanism 30 includes a flexible tether 32 formed of a polyamide woven fabric and the like and a pair of facing sheet parts 34 and 39. Incidentally, in the internal pressure adjusting mechanism 30, the exhaust ports 27 are provided in two places the left wall part 21d and the right wall part 21e of the bag part 20, and, in the case of the embodiment, are arranged in two places to correspond to the two exhaust ports 27.

In the tether 32, a tip 32b extending from an attaching base part 32a is coupled with the peripheral edge of the exhaust port 27. In the case of the embodiment, the two tethers 32 are arranged to correspond to the right and left exhaust ports 27, respectively. The attaching base part 32a is coupled with a portion close to the rear wall part 21a in the vicinity of the center in the right and left direction in the lower wall part 21c of the bag part 20 by sewing. The tips 32b of the tethers 32 are coupled with leading edge side parts 44 (to be described) in the peripheral edges of the right and left exhaust ports 27 by sewing, respectively.

In the case of the embodiment, as illustrated in FIGS. 4A to 8D, the internal pressure adjusting mechanism 30 adjusts the exhaust of the inflation gas G to be in an exhaust mode EM in which the exhaust of the inflation gas G from the exhaust port 27 is facilitated when the tether 32 is loosened, and to be in an exhaust suppression mode RM in which the exhaust of the inflation gas G from the exhaust port 27 is suppressed when the tether 32 is stretched. Specifically, a state where the tether 32 is stretched indicates a state where the rear wall part 21a of the bag part 20 passes over the rear surface 3 of the instrument panel 1, and the attaching base part 32a is arranged in a retreated position BP which is on the rear side from the rear surface 3 (see FIG. 7B), and in that case, the internal pressure adjusting mechanism 30 is in the exhaust suppression mode RM. The tether 32 is loosened when the attaching base part 32a is on the front side from the retreated position BP, for example, is in the vicinity of the rear surface 3 (see FIG. 6B), and in this case, the internal pressure adjusting mechanism 30 is in the exhaust mode EM. When the attaching base part 32a is positioned on the front side from the retreated position BP, the loosened state of the tether 32 is maintained even in the middle of the inflation of the bag part 20. As illustrated in FIGS. 6A and 6B, in a case where the rear wall part 21a abuts on the adjacent occupant IP, the tether 32 is not stretched to maintain the loosened state.

Incidentally, the tether 32 is configured such that the tip 32b is set as an main tether which is coupled to an outside surface 44c side in the leading edge side part 44 (to be described) in the internal pressure adjusting mechanism 30. In the internal pressure adjusting mechanism 30 of the embodiment, in addition to the main tether 32, an auxiliary tether 55 is also arranged in the bag part 20. In the auxiliary tether 55, a root part 55a side is coupled with the attaching base part 32a side of the main tether 32, and a tip 55b is coupled with a back surface 36c side of a facing edge part 36 of a short side part 34 (to be described) of the internal pressure adjusting mechanism 30.

The tethers 32 and 55 have a width dimension smaller than the width dimension of the portions (leading edge side part 44 or facing edge part 36) which couple the tips 32b and 55b, and are coupled with the center of the portions (leading edge side part 44 or facing edge part 36) in the width direction.

As illustrated in FIGS. 4A and 5B, the pair of facing sheet parts 34 and 39 of the internal pressure adjusting mechanism 30 are arranged to extend from both edges 28a and 28b which face to each other in the front and rear direction in the peripheral edge 28 of the exhaust port 27 on an outer peripheral surface 20a side of the bag part 20, and are formed of a flexible member. The pair of facing sheet parts 34 and 39 include the facing edge parts 36 and 41 which extend from the peripheral edge 28 of the exhaust port 27 in a belt shape to face each other with the exhaust port 27 interposed therebetween. Further, in the pair of facing sheet parts 34 and 39, one thereof is configured as a long side part 39 which includes an extending sheet part 43 which extends from the facing edge part 41 to be separated from the peripheral edge 28 of the exhaust port 27 to couple the tether 32 with the tip side (leading edge side part) 44. The other is configured as the short side part 34 which includes only the facing edge part 36 without the extending sheet part 43.

Figure 10A:
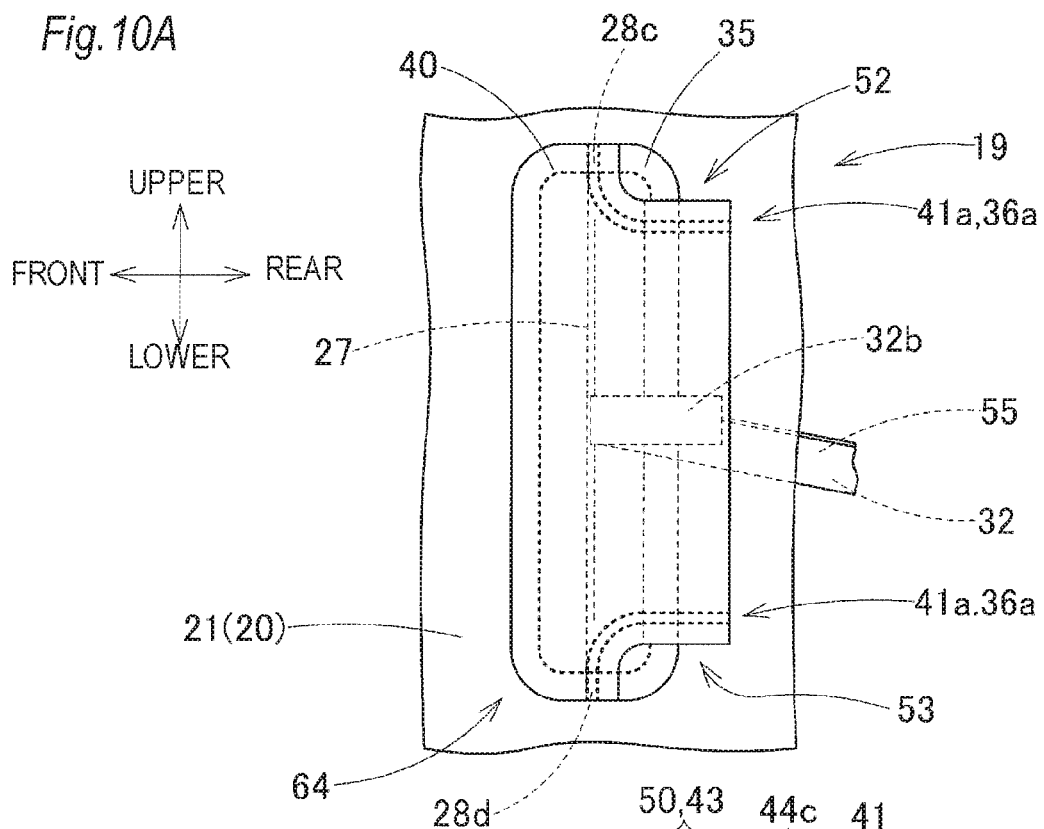
FIGS. 10A and 10B are views for sequentially explaining a manufacturing process of the internal pressure adjusting mechanism of the airbag of the embodiment, and explains a process after the process shown in FIGS. 9A to 9C.
Figure 10B:
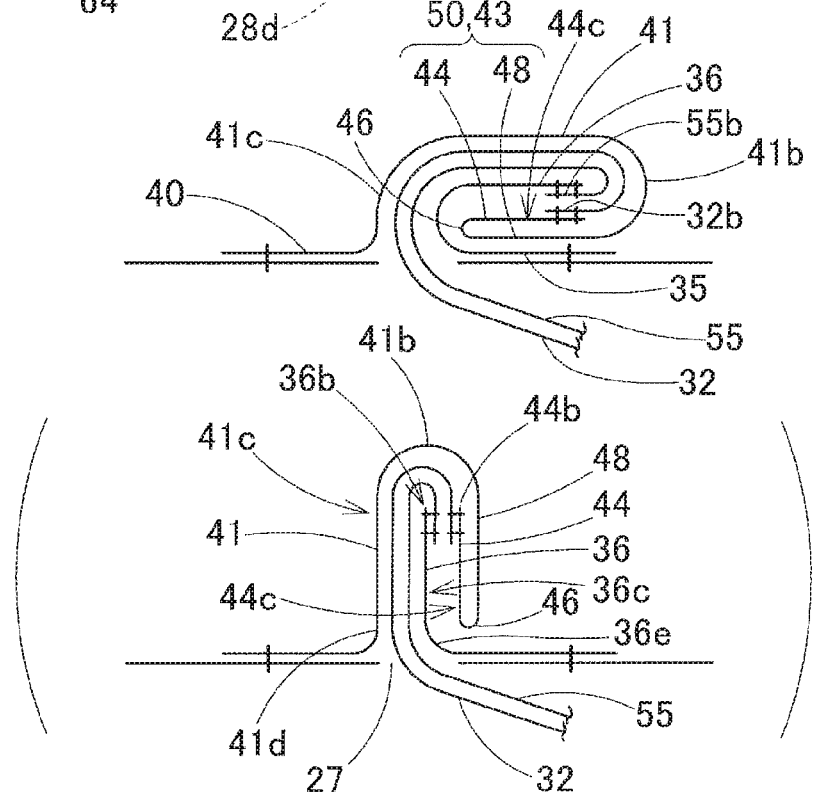
Figure 11A:
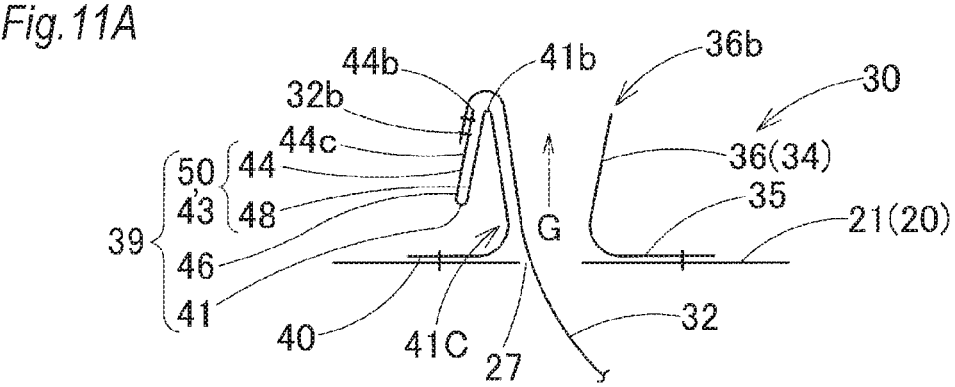
FIGS. 11A to 11D are longitudinal sectional views for schematically explaining an operation state of a modification of the internal pressure adjusting mechanism of the embodiment, FIG. 11A corresponds to the exhaust mode, and FIG. 11D corresponds to the exhaust suppression mode.
Figure 11B:
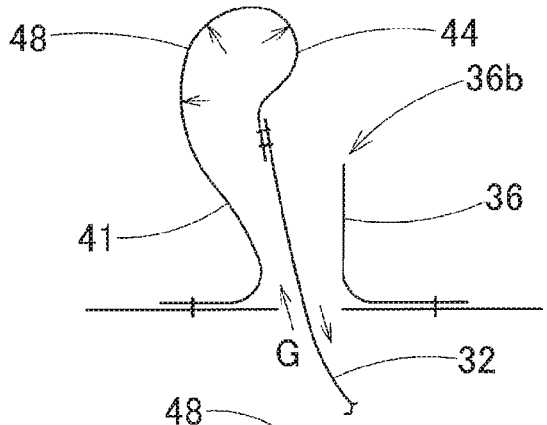
Figure 11C:
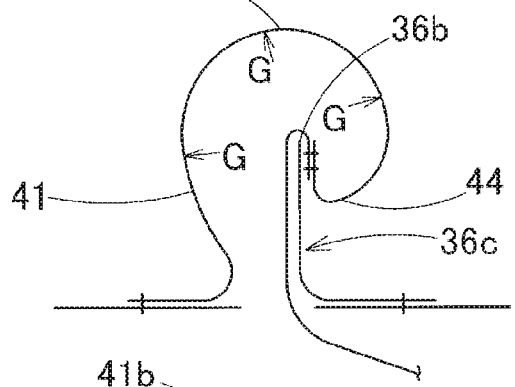
Figure 11D:
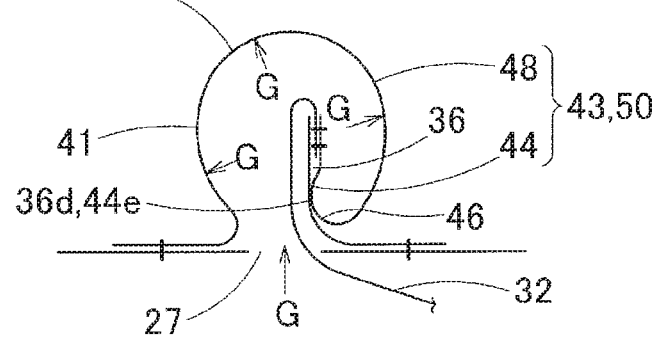

As illustrated in the parentheses of FIG. 10B, the extending sheet part 43 of the long side part 39 can form a folded portion 50 in such a manner that the extending sheet part 43 extends from the facing edge part 41 to cover a terminal 36b of the facing edge part 36 of the short side part 34 and pass over the facing edge part 36 of the short side part 34, and is folded back to the back surface 36c side opposite to the exhaust port 27 side in the facing edge part 36 of the short side part 34. The folded portion 50 includes the leading edge side part 44 which can be arranged to be close to the back surface 36c side of the facing edge part 36 of the short side part 34, and coupled with the tether 32, and a root side part 48 which is provided with a reversed part 46 between the leading edge side part 44 and is connected from the leading edge side part 44 to an end part 41b side of the facing edge part 41 of the long side part 39.

In the basic arranged state (basic arranged state or initial coupled state), in the long side part 39 and short side part 34, both edges 41*a* and 36*a* in a direction (width direction) perpendicular to the direction in which the facing edge parts 41 and 36 face each other are coupled with each other in a state where the folded portion 50 is formed on the back surface 36*c* side of the facing edge part 36 of the short side part 34, and in a state where the facing edge parts 41 and 36 are overlapped with each other (see FIGS. 10A and 10B). The initial coupled state is almost the same as a state where the inflation gas G is extracted from the inner peripheral side of the long side part 39 in the longitudinal sectional shape of the exhaust suppression mode RM, that is, a state where the long side part 39 is not inflated (see the illustration in the parentheses of FIGS. 4B and 10B).

Figure 9A:
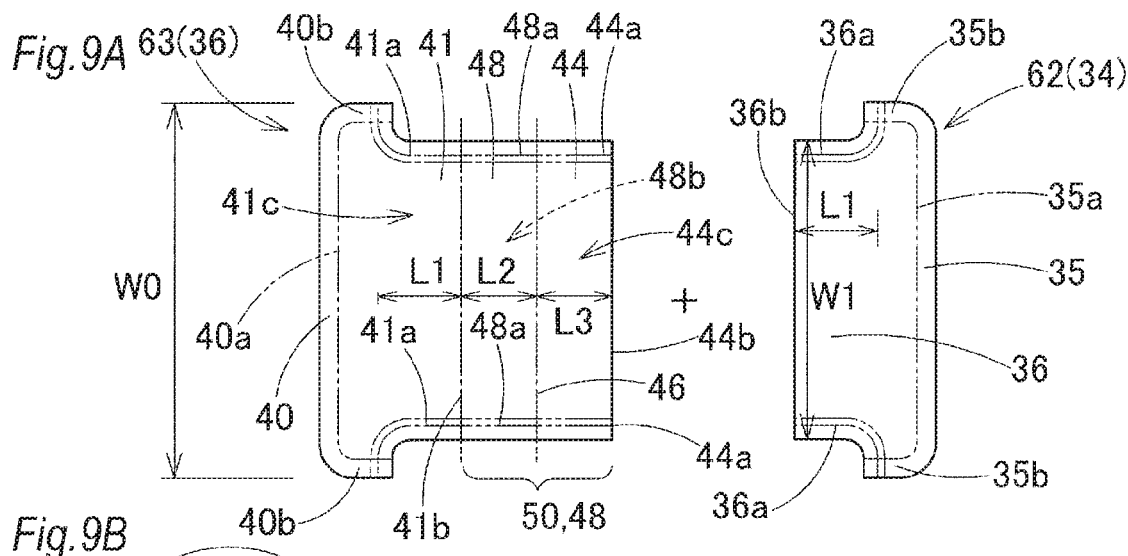
FIGS. 9A to 9C are views for sequentially explaining a manufacturing process of the internal pressure adjusting mechanism of the airbag of the embodiment, and FIG. 9B includes an end elevational view at IXB-IXB line shown in FIG. 9B.

As illustrated in FIG. 9A, the long side part 39 is formed of a long side basic fabric 63, and the short side part 34 is formed of a short side basic fabric 62. Similarly to the circumferential wall 21 of the bag part 20, the long side basic fabric 63 or the short side basic fabric 62 is formed of a woven fabric such as polyamide.

With respect to a front edge 28*a* in the peripheral edge 28 of the exhaust port 27, the long side basic fabric 63 includes an attaching edge part 40 coupled by sewing, the belt-shaped facing edge part 41 extending from the attaching edge part 40, the root side part 48 of the extending sheet part 43 extending from the facing edge part 41, and the leading edge side part 44 on the leading edge side of the extending sheet part 43. With respect to the rear edge 28*b* in the peripheral edge 28 of the exhaust port 27, the short side basic fabric 62 includes the attaching edge part 35 coupled by sewing, and the belt-shaped facing edge part 36 extending from the attaching edge part 35.

As illustrated in FIGS. 9B and 9C or FIGS. 10A and 10B, the outer peripheral edges of the attaching edge parts 40 and 35 are sutured in an area which is two-divided into the front edge 28*a* side and the rear edge 28*b* side, the area also including upper and lower edges 28*c* and 28*d* in the peripheral edge 28 of the exhaust port 27 of the outer peripheral surface 20*a* of the bag part 20, and in the attaching edge parts 40 and 35.

Figure 9B:
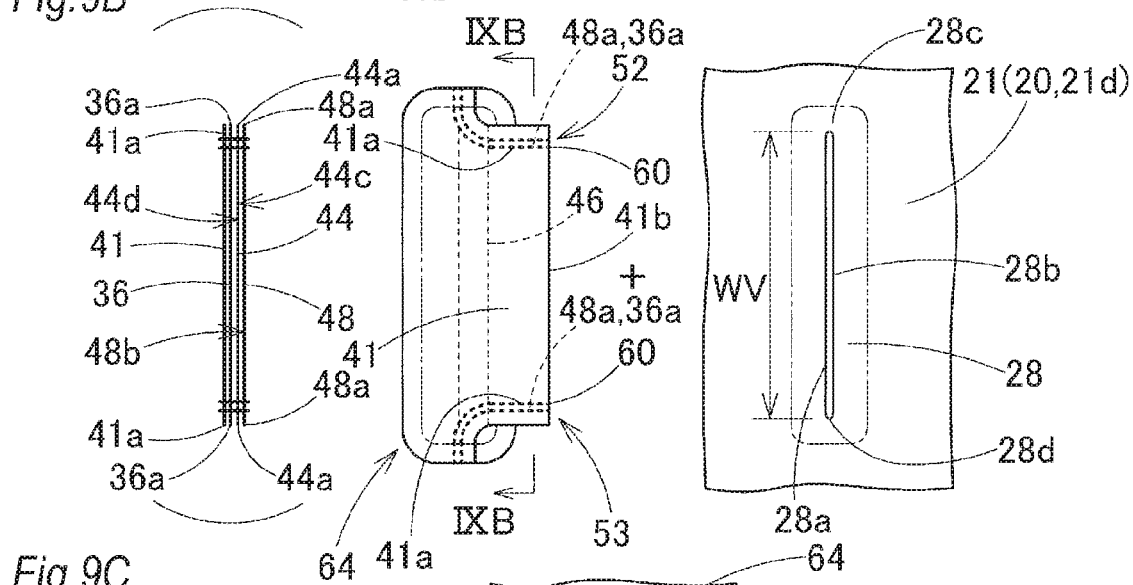
Figure 9C:
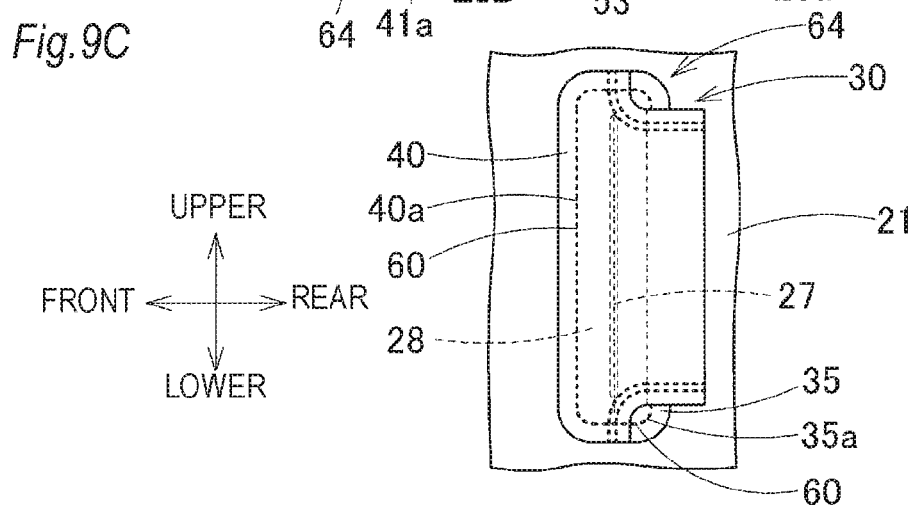

Incidentally, as illustrated in FIGS. 9A to 9C, in a length dimension of the short side part 34 or the long side part 39 from the peripheral edge of the exhaust port 27, a length dimensions L1 of the facing edge parts 36 and 41 are the same as each other, and a length dimensions L2 of the root side part 48 of the extending sheet part 43 or a length dimension L3 of the leading edge side part 44 of the extending sheet part 43 is shorter than the length dimension L1 of the facing edge part 41. The length dimension L2 of the root side part 48 and the length dimension L3 of the leading edge side part 44 are almost the same.

A width dimension W1 of each of the facing edge parts 36 and 41 and the extending sheet part 43 is almost the same as an opening width WV in the vertical direction on the long side of the exhaust port 27 of the non-inflated bag part 20 (see FIGS. 9A to 9C). In the attaching edge parts 35 and 40, a width dimension W0 is larger than the opening width WV in the vertical direction on the long side of the exhaust port 27.

As illustrated in FIGS. 9A and 9B, in the process to form the pair of facing sheet parts 34 and 39, the attaching edge parts 40 and 35 are overlapped with each other, and the facing edge parts 41 and 36 are overlapped with each other in the long side basic fabric 63 and the short side basic fabric 62. The leading edge side part 44 of the long side basic fabric 63 is folded at the reversed part 46 to be overlapped with the inner surface 48*b* side of the root side part 48 and further is folded at the end part 41*b* of the facing edge part 41 in the overlapped state, and the leading edge side part 44 is overlapped with the back surface 36*c* side of the facing edge part 36 of the short side basic fabric 62 (see FIG. 10B or the illustration in the parentheses). Further, in the overlapped long side basic fabric 63 and short side basic fabric 62, both edges 41*a*. 44*a*, 48*a*, and 36*a* of the facing edge parts 41 and 36 or the extending sheet part 43 in the width direction are coupled with the side edges 40*b* and 35*b* of the attaching edge parts 40 and 35 continuous to those edges by using a suture 60, so as to form coupled parts 52 and 53. Then, a facing sheet member 64 can be formed.

As illustrated in FIGS. 9B and 9C, the attaching edge parts 40 and 35 of a facing sheet member 64 are opened, and the peripheral edges of the attaching edge parts 40 and 35 are coupled with the front edge 28*a* side and the rear edge 28*b* side which include also the upper and lower edges 28*c* and 28*d* in the peripheral edge 28 of the exhaust port 27 of the bag part 20 by using the suture 60, so as to form the coupled parts 40*a* and 35*a*. Then, the pair of facing sheet parts 39 and 34 can be formed in the peripheral edge 28 of the exhaust port 27. Thereafter, as illustrated in FIGS. 10A and 10B, the tip 32*b* of the main tether 32 is coupled with the outside surface 44*c* continuous to the outside surface (back surface) 41*c* of the facing edge part 41 in the leading edge side part 44, and the tip 55*b* of the auxiliary tether 55 is coupled with the back surface (outside surface) 41*c* side of the facing edge part 41. Then, the internal pressure adjusting mechanism 30 can be formed to manufacture the airbag 19.

Incidentally, in the main tether 32 or the auxiliary tether 55, for example, the attaching base part 32 of the main tether 32 coupled with the root part 55*a* may be coupled in a predetermined position of the circumferential wall 21 in advance and be inserted into the exhaust port 27 after the facing sheet member 64 is coupled with the circumferential wall 21, and the tips 32*b* and 55*b* may be coupled with the leading edge side part 44 and the facing edge part 36 as described above. In addition, before the tethers 32 and 55 are provided, the inflow opening 23 or the attaching seat 22 is formed in the bag part 20 in advance.

A length dimension LM (see FIG. 7B) of the main tether 32 is set in such a manner that, in a state where the main tether 32 is stretched in the exhaust suppression mode RM of the internal pressure adjusting mechanism 30 (see FIG. 4B), the leading edge side part 44 is stretched such that the facing edge part 41 of the long side part 39 and the root side part 48 of the folded portion 50 are inflated around the facing edge part 36 of the short side part 34 and the leading edge side part 44 of the long side part 39 is allowed to press-contact the back surface 36*c* side of the facing edge part 36 of the short side part 34, in a state where the long side part 39 is arranged on the outer peripheral surface 20*a* side of the bag part 20. In addition, the length dimension LM of the main tether 32 is set such a manner that, in a state where the main tether 32 is loosened in the exhaust mode EM of the internal pressure adjusting mechanism 30 (see FIG. 5B), the main tether 32 is coupled with the leading edge side part 44 such that the folded portion 50 of the long side part 39 is arranged on the back surface 41*c* side, which is opposite to the exhaust port 27 side, of the facing edge part 41 of the long side part 39 and the facing edge part 41 of the long side part 39 and the facing edge part 36 of the short side part 34 are separable from each other.

Similarly, a length dimension LS (see FIG. 7B) of the auxiliary tether 55 is set in such manner that, in a state where the auxiliary tether 55 is stretched in the exhaust suppression mode RM of the internal pressure adjusting mechanism 30 (see FIG. 4B), the facing edge part 36 of the short side part 34 is stretched such that the back surface 36c side of the facing edge part 36 of the short side part 34 is allowed to press-contact the leading edge side part 44 of the long side part 39 and the inflation to the leading edge side part 44 side is regulated, in a state where the short side part 34 is arranged on the outer peripheral surface 20a side of the bag part 20. Further, the length dimension LS of the auxiliary tether 55 is set in such a manner that, in a state where the auxiliary tether 55 is loosened in the exhaust mode EM of the internal pressure adjusting mechanism 30 (see FIG. 5B), the auxiliary tether 55 is coupled with the facing edge part 36 of the short side part 34 such that the facing edge part 36 of the short side part 34 is separable from the facing edge part 41 of the long side part 39. In other words, the length dimension LS of the auxiliary tether 55 is set to regulate in such a manner that the terminal 36b of the facing edge part 36 is not inflated further than the leading edge side part 44 when the folded portion 50 is reversed in a process that the exhaust mode EM is shifted to the exhaust suppression mode RM during the inflation of the bag part 20.

After the internal pressure adjusting mechanism 30 is attached in the bag part 20 to manufacture the airbag 19, first, the bolts 9a are allowed to protrude from the attaching hole 24, the retainer 9 is housed in the bag part 20, and the bag part 20 of the airbag 19 is folded-up together with the tethers 32 and 55 so as to be mounted as the airbag device M in the vehicle. Incidentally, the airbag 19 is wrapped by a wrapping material for collapse prevention (not illustrated) so as not to be collapsed.

Incidentally, when folding the airbag 19, the internal pressure adjusting mechanism 30 is set in the state of the exhaust mode EM illustrated in the parentheses of FIG. 2 or in FIGS. 5A and 5B. That is, from the initial coupled state illustrated in FIG. 10B, the tethers are folded back in the vicinity of the tip 41b of the facing edge part 41 of the long side part 39, and the folded portion 50 is reversed to the back surface 41c side of the facing edge part 41. The tips 32b and 55b of the tethers 32 and 55 is sent out from the exhaust port 27, the facing edge part 36 and the facing edge part 41 face each other with the exhaust port 27 interposed therebetween, and the airbag 19 is folded up in that state.

After the folded-up airbag 19 is wrapped by the wrapping material, the bolts 9a are allowed to protrude from the bottom wall part 12a of the case 12, and the folded-up airbag 19 is housed in the case 12. The main body part 8a of the inflator 8 is inserted into the case 12 from the lower side of the bottom wall part 12a of the case 12, the bolts 9a protruding from the bottom wall part 12a are inserted to the flange part 8c of the inflator 8, and nuts 10 are fastened by the bolts 9a protruding from the flange part 8c of the inflator 8. Then, the airbag 19 can be attached in the case 12 together with the inflator 8. Further, with respect to the connection wall part 6c of the airbag cover 6 in the instrument panel 1 mounted in the vehicle, the locking claw 12c is inserted into the locking hole 6d so as to lock the circumferential wall part 12b of the case 12, and a predetermined bracket (not illustrated) of the case 12 is fixed on the body of the vehicle. Then, the airbag device M can be mounted in the vehicle.

After the airbag device M is mounted in the vehicle, if the inflation gas is discharged from the gas discharge ports 8b of the inflator 8 at the time of collision of the vehicle, the airbag 19 is inflated by allowing the inflation gas to flow therein, so as to rupture the wrapping material (not illustrated) and to press and open the door parts 6a and 6b of the airbag cover 6. The airbag 19 protrudes upward from the case 12 through the opening formed by pressing and opening the door parts 6a and 6b of the airbag cover 6, and is deployed while protruding to the rear side of the vehicle. Then, as illustrated in the two-dot chain line of FIG. 1, the inflation is completed to close a space between the upper surface 2 of the instrument panel 1 and the windshield 4 above the instrument panel 1.

Figure 6A:
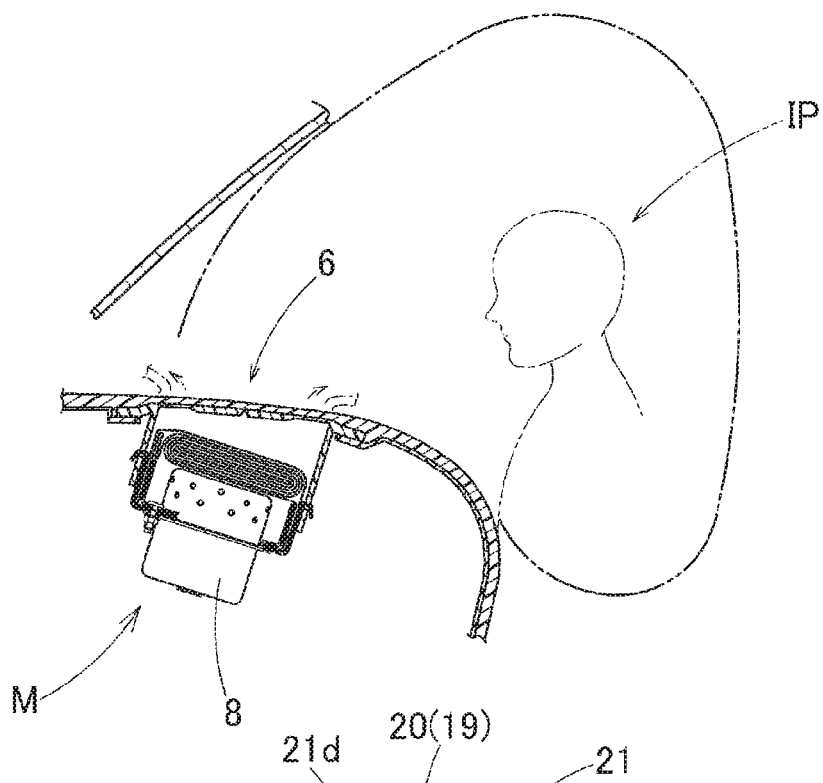
FIGS. 6A and 6B are views for explaining an inflation process during an operation of the airbag in the embodiment, and illustrate a state where an occupant approaches.
Figure 6B:
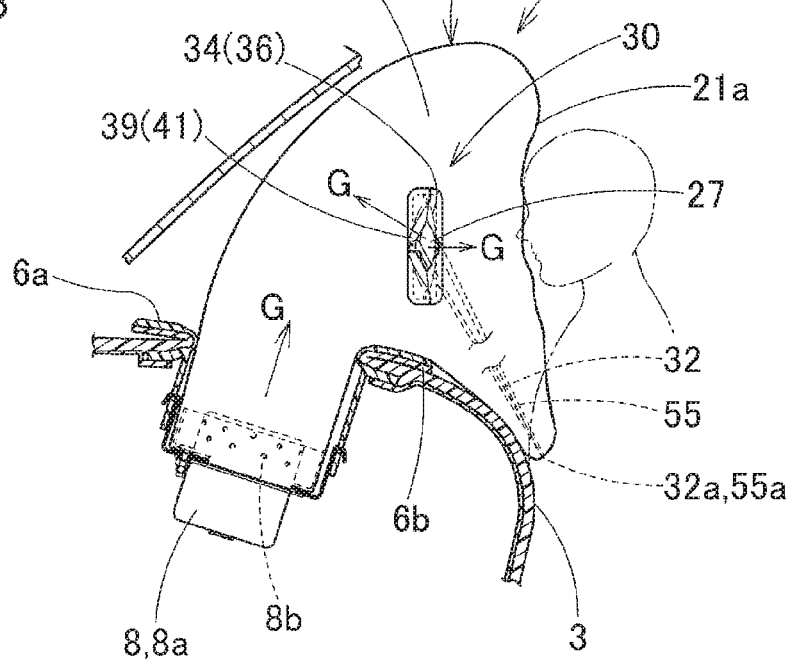

Thereafter, as illustrated in FIGS. 6A and 6B, in the internal pressure adjusting mechanism 30, the rear wall part 21a of the bag part 20 interferes with the adjacent occupant IP, and the tether 32 is loosened in a state the attaching base part 32a is allowed not to reach the retreated position BP (see FIG. 7B) and to stand by on the front side thereof. Then, the state of the exhaust mode EM can be maintained. That is, in the exhaust mode EM, as illustrated in FIGS. 5A and 5B, the folded portion 50 of the long side part 39 in the pair of facing sheet parts 34 and 39 can be arranged on the back surface 41c side opposite to the exhaust port 27 in the facing edge part 41 of the long side part 39, and the facing edge parts 36 and 41 are separable from each other. The inflation gas G is exhausted from the exhaust port 27 outside the bag part 20 through a space between the facing edge parts 36 and 41 of the pair of separated facing sheet parts 34 and 39.

Therefore, although the airbag 19 interferes (abut) with the adjacent occupant IP during the initial inflation, the airbag 19 does not press strongly, and the inflation gas G is continuously exhausted from the exhaust port 27. The operation of the airbag device M is completed without reaching the shape at the time of completion of inflation.

Figure 7A:
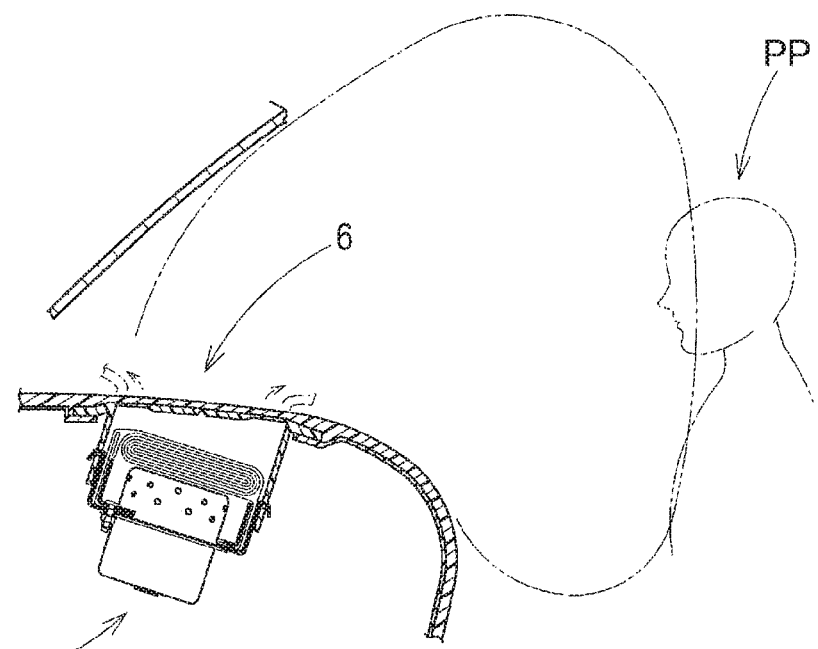
FIGS. 7A and 7B are views for explaining an inflation process during an operation of the airbag in the embodiment, and illustrate a state where an occupant is positioned in a proper position.
Figure 7B:
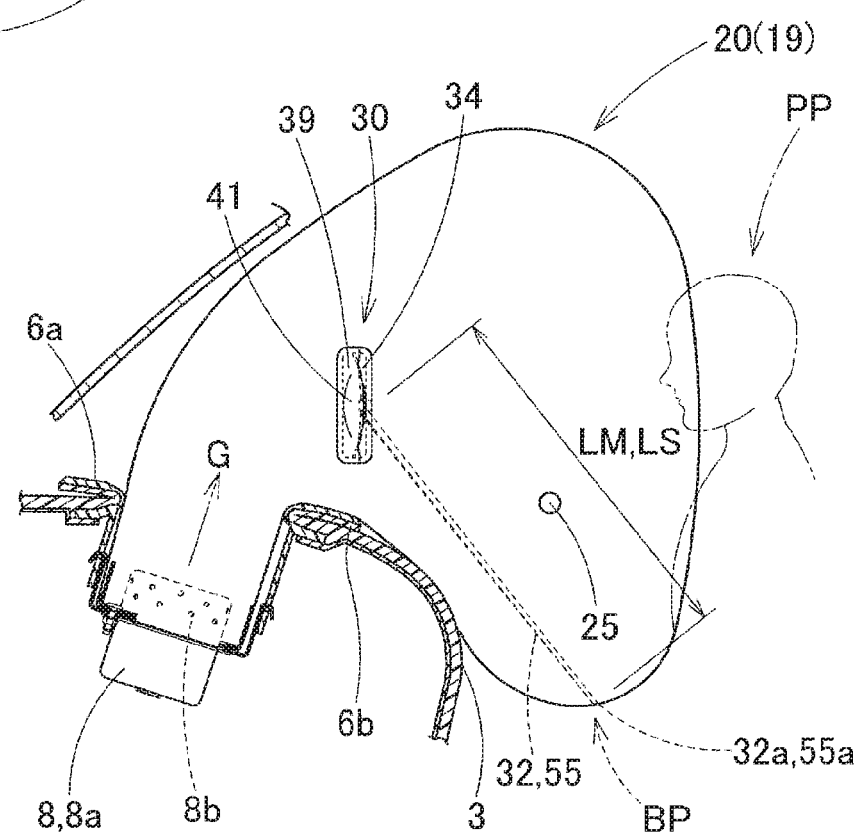
Figure 8A:
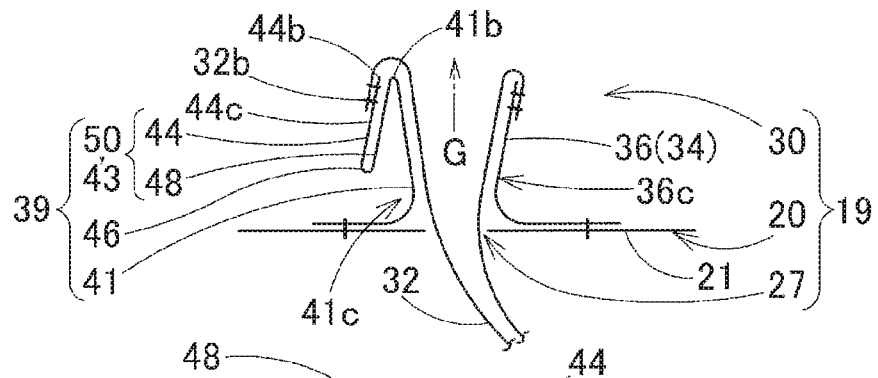
FIGS. 8A to 8D are schematic longitudinal sectional views for sequentially explaining a state where the exhaust mode of an internal pressure adjusting mechanism of the embodiment is shifted to the exhaust suppression mode, FIG. 8A corresponds to the exhaust mode, and FIG. 8D corresponds to the exhaust suppression mode.
Figure 8B:
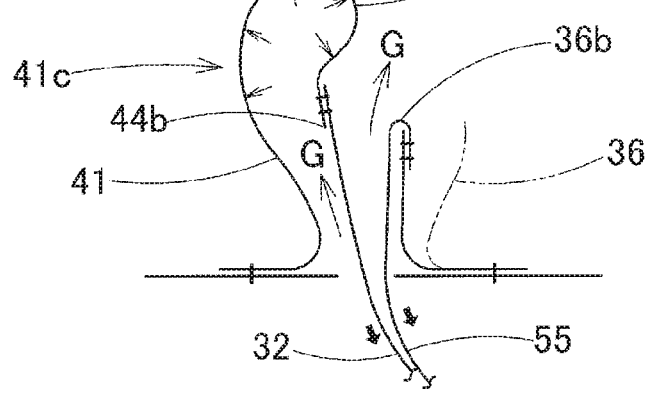
Figure 8C:
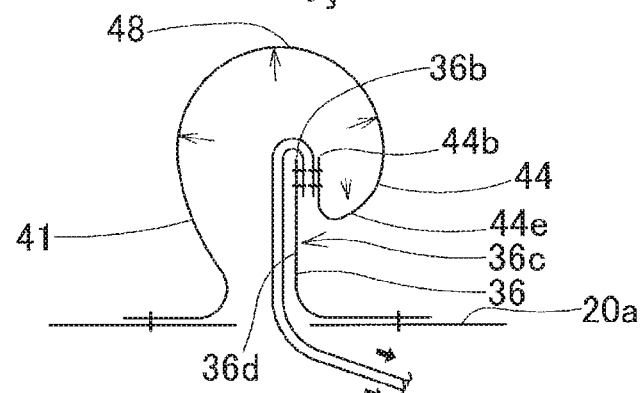
Figure 8D:
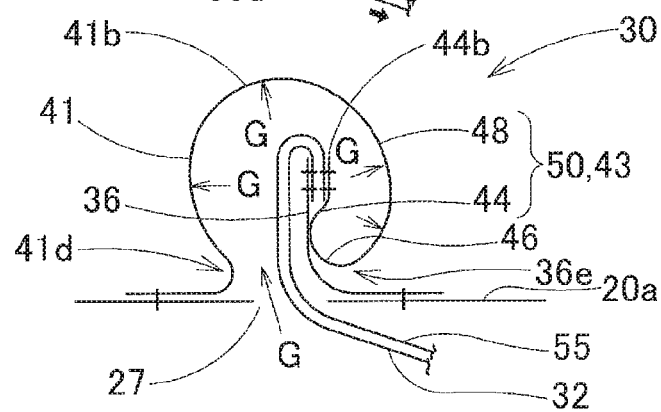

In a state where the occupant PP is in a proper position of being separated from the instrument panel 1, in a case where the airbag device M is operated, as illustrated in FIGS. 7A and 7B, the airbag 19 is inflated with the internal pressure higher than the inflation gas G which flows in the bag part 20. Then, when the tether 32 is stretched, as illustrated in FIGS. 8A and 8B, the tether 32 stretches a portion coupling the tip 32b, that is, the leading edge side part 44 on the tip side of the extending sheet part 43 in one long side part 39 of the pair of facing sheet parts 39 and 34 in the peripheral edge 28 of the exhaust port 27. Further, the leading edge side part 44 of the long side part 39 is stretched by the tether 32 and enters into a space between the facing edge parts 41 and 36 of the long side part 39 and the short side part 34. However, the root side part 48 of the folded portion 50 between the facing edge part 41 and the leading edge side part 44 of the long side part 39 receives a pressure of the inflation gas G which is exhausted from between the facing edge parts 41 and 36 of the long side part 39 and the short side part 34. At that time, the long side part 39 and the short side part 34 are in a coupled state with the peripheral edge of the exhaust port 27, as illustrated in FIGS. 10A and 10B, in advance, the facing edge part 36 of the short side part 34 facing the facing edge part 41 of the long side part 39 is arranged between the facing edge part 41 of the long side part 39 and the root side part 48 of the folded portion 50, and the leading edge side part 44 reversed through the reversed part 46 is arranged between the facing edge part 36 and the root side part 48 of the short side part 34. The reversed part 46 is in the state of approaching to be closer to the circumferential wall 21 of the bag part 20 than the terminal 41b of the facing edge part 41 of the long side part 39, and four pieces of the facing edge parts 41 and 36 of the long side part 39 and the short side part 34, the leading edge side part 44, and the root side part 48 are coupled overlappingly on both edges 41a and 36a side (width direction side) orthogonal to the direction in which the facing edge parts 41 and 36 of the long side part 39 and the short side part 34 face each other. For this reason, when the root side part 48 of the folded portion 50 receives the pressure of the inflation gas G exhausted from the exhaust port 27, as illustrated in FIGS. 8B, 8C, and 8D, the folded portion 50 together with the reversed part 46 is reversed with the vicinity of the tip (a boundary portion of the facing edge part 41 and the extending sheet part 43) 41b of the facing edge part 41 of the long side part 39 set as a center, so as to pass over the terminal (tip) 36b of the facing edge part 36 of the short side part 34 from the back surface 41c side of the facing edge part 41 of the long side part 39 and approach the circumferential wall 21 of the bag part 20 on the back surface 36c side of the facing edge part 36 of the short side part 34. Thus, the root side part 48 returns to the coupled state (which is the coupled state of the folded portion 50 and is a state where the root side part 48 is arranged on the back surface 36c side of the facing edge part 36 of the short side part 34, the reversed leading edge side part 44 is arranged between the root side part 48 and the facing edge part 36 of the short side part 34, and the reversed part 46 is allowed to approach to be closer to the circumferential wall 21 side of the bag part 20 than the terminal 41b of the facing edge part 41 of the long side part 39).

As illustrated in FIG. 8D, in the reversed state, the facing edge part 41 of the long side part 39 covers the exhaust port 27 side of the facing edge part 36 of the short side part 34, the root side part 48 of the extending sheet part 43 (folded portion 50) covers the tip 36b of the facing edge part 36 of the short side part 34, and the back surface 36c side of the facing edge part 36 of the short side part 34 is covered by the pressure of the inflation gas G flowing in between the root side part 48 and the leading edge side part 44 with the leading edge side part 44 which press-contacts the facing edge part 36 of the short side part 34 with high sealability, thereby closing the exhaust port 27. In addition, in both edges 28c and 28d (both edge sides in a direction perpendicular to the direction in which the facing edge parts 36 and 41 face each other) which are not provided in the facing edge parts 36 and 41 of the exhaust port 27, the facing edge part 36 of the short side part 34, the facing edge part 41 of the long side part 39, the root side part 48, and the leading edge side part 44 are coupled by the coupled parts 52 and 53, and thus the leakage of the inflation gas G does not occur. With such an exhaust suppression state, the wrinkle hardly occurs and the gap can be lessened compared to a case where the tube portion in the related art is gathered to the center side to close the exhaust port. Thus, the leakage of the inflation gas can be suppressed stably.

As illustrated in FIGS. 4A to 4C, in the close state of the exhaust port 27, the leading edge side part 44 is allowed to approach the tip 36b side of the facing edge part 36 of the short side part 34 by reversing the tip 44b from the reversed part 46, the entire area of both edges 44a and 44a from the reversed part 46 to the tip 44b are coupled with both edges 36a and 36a of the facing edge part 36 of the short side part 34 (see FIG. 9B), and thus a situation hardly occurs in which the tip 44b of the leading edge side part 44 passes over the terminal 36b of the short side part 34 to be turned up to the exhaust port 27 side. Particularly, since the internal pressure of the bag part 20 is received so that a portion 44e of the leading edge side part 44 is allowed to press-contact the portion 36d on the back surface 36c side of the facing edge part 36 of the short side part 34, further, the tip 44b of the leading edge side part 44 is hardly turned up, and the leakage of the inflation gas G from the exhaust port 27 does not occur. That is, in such a configuration, although the tether 32 is loosened, when the internal pressure is applied to the bag part 20, the inflation gas G is hardly exhausted from the exhaust port 27, so as to ensure the stable exhaust suppression mode RM. Further, the inflation of the airbag 19 is completed rapidly, and the occupant PP is received and protected with excellent cushioning property.

Therefore, in the airbag 19 of the embodiment, the exhaust suppression mode RM of the bag part 20 can be ensured stably by the internal pressure adjusting mechanism 30. In addition, the internal pressure adjusting mechanism 30 is configured by the tether 32 and the pair of facing sheet parts 39 and 34 both having flexibility. Thus, the internal pressure adjusting mechanism 30 can be easily folded up together with the bag part 20, and the folding or the housing property of the airbag 19 is not inhibited.

In the airbag 19 of the embodiment, the tip 55b of the auxiliary tether 55 that is coupled with the attaching base part 32a side of the main tether 32 is coupled with the facing edge part 36 of the short side part 34. As illustrated in FIGS. 4B and 7B, the auxiliary tether 55 has the length dimension LS in which in a state where the auxiliary tether 55 is stretched during the exhaust suppression mode RM of the internal pressure adjusting mechanism 30, the facing edge part 36 of the short side part 34 is stretched such that the back surface 36c side of the facing edge part 36 of the short side part 34 is allowed to press-contact the leading edge side part 44 of the long side part 39. In addition, the auxiliary tether 55 is set to have the length dimension LS in which in a state where the auxiliary tether 55 is loosened during the exhaust mode EM of the internal pressure adjusting mechanism 30, the auxiliary tether 55 is coupled with the facing edge part 36 of the short side part 34 such that the facing edge part 36 of the short side part 34 is separable from the facing edge part 41 of the long side part 39.

For this reason, in the embodiment, the auxiliary tether 55 can prevent that the facing edge part 36 of the short side part 34 is turned up unintentionally during the inflation of the bag part 20, and the exhaust mode EM can be smoothly shifted to the exhaust suppression mode RM. That is, when the bag part 20 is inflated so that the main tether 32 coupled with the leading edge side part 44 of the long side part 39 is stretched, and a mode shift is performed to the exhaust suppression mode RM, the auxiliary tether 55 stretches the facing edge part 36 of the short side part 34 to prevent an unintentional turn-up. That is, as illustrated in the two-dot chain line of FIG. 8B, a state does not occur which the airbag is inflated such that the terminal 36b side of the facing edge part 36 of the short side part 34 is separated from the exhaust port 27. For this reason, as illustrated in FIGS. 8B and 8C, when the folded portion 50 is reversed from the back surface 41c side of the facing edge part 41 of the long side part 39 to the back surface 36c side of the facing edge part 36 of the short side part 34, the tip 44b of the leading edge side part 44 of the folded portion 50 does not enter into the exhaust port 27 in the facing edge part 36 of the short side part 34, and is smoothly reversed to the back surface 36c of the facing edge part 36 of the short side part 34. As a result, the folded portion 50 is smoothly reversed to the back surface 36c side of the facing edge part 36 of the short side part 34, and in the internal pressure adjusting mechanism 30, the exhaust mode EM can be smoothly shifted to the exhaust suppression mode RM.

Incidentally, the internal pressure adjusting mechanism 30 may be configured by the main tether 32 and the facing sheet parts 34 and 39 without the auxiliary tether 55 as long as when the exhaust mode EM is shifted to the exhaust suppression mode RM, the tip 36b side of the facing edge part 36 of the short side part 34 is hardly inflated due to a relation such as the arranged position of the exhaust port 27, and a mode shift can be performed smoothly as illustrated in FIGS. 11A to 11D.

In the airbag 19 of the embodiment, the exhaust port 27 has a substantially vertically-long rectangular opening shape (a slit shape in the embodiment) in which both edges 28*a* and 28*b* provided with the facing edge parts 36 and 41 of the pair of facing sheet parts 34 and 39 in the peripheral edge 28 are lengthened compared to both edges 28*c* and 28*d* orthogonal to the facing direction of the facing edge parts 36 and 41 and which is formed in a linear shape.

For this reason, in the embodiment, in the pair of facing sheet parts 34 and 39, the root parts 36*e* and 41*d* of the facing edge parts 36 and 41 of the peripheral edge of the exhaust port 27 can be arranged in the linear shape along the edges 28*a* and 28*b*, respectively. Thus, although the portion 36*d* of the facing edge part 36 of the short side part 34 which press-contacts the press-contact portion 44*e* of the leading edge side part 44 during the exhaust suppression mode RM is arranged to approach the circumferential wall 21 side of the bag part 20, the leading edge side part 44 and the facing edge part 36 of the short side part 34 can be stably press-contacted with each other in a planar shape (a planar shape which is along the edges 28*a* and 28*b*) with high sealability. That is, the length dimension L1 that extends from the peripheral edge 28 of the exhaust port 27 of the facing edge part 36 can be shortened, and the pair of facing sheet parts 34 and 39 can be formed without a bulky shape. Incidentally, when the exhaust port 27 is open in a circular shape or a long circular shape, the edge in which the facing sheet parts 34 and 41 are arranged is formed in an arc shape. Thus, when the portions which press-contact with each other during the exhaust suppression mode RM are not provided to have long the distance from the peripheral edge of the exhaust port, the wrinkle occurs, and a flatness cannot be ensured so that the portions cannot press-contact each other. Further, in order that the wrinkle does not occur and the press contact is performed in the planar shape, the respective press-contact portions 36*d* and 44*e* are necessarily provided to have a long distance from the exhaust port 27, and thus the length dimension L1 that extends from the peripheral edge 28 of the exhaust port 27 of the facing edge part 36 is lengthened. Therefore, the facing sheet parts 34 and 36 become bulky, which is not preferable.

In the embodiment, the attaching base part 32*a* side of the tether 32 is attached in the circumferential wall 21 (lower wall part 21*c*) side close to the rear wall part 21*a* on the side protruding during inflation in the bag part 20. However, if the tether 32 acts such that the extending sheet part 43 is reversed from the exhaust mode EM to the exhaust suppression mode RM, the attaching base part 32*a* side can be properly modified, for example, to be coupled with the attaching seat 22 side having the inflow opening 23 of the bag part 20.

In the embodiment, a configuration has been described in which the two exhaust ports 27 are provided in the bag part 20, the pair of facing sheet parts 34 and 39 coupled with the tethers 32 and 55 are provided in the exhaust ports 27, respectively. However, one exhaust port 27 may be formed in the bag part 20, and the pair of facing sheet parts 34 and 39 coupled with the tethers 32 and 55 may be provided in the one exhaust port 27. Of course, on the contrary, three or more exhaust ports 27 may be formed in the bag part 20, and the pair of facing sheet parts 34 and 39 coupled with the tethers 32 and 55 may be provided in at least one exhaust port 27.

In the embodiment, the pair of facing sheet parts 34 and 39 are formed of the facing sheet member 64, the facing sheet member 64 is attached with respect to the peripheral edge 28 of the exhaust port 27 in the circumferential wall 21 of the bag part 20, and the pair of facing sheet parts 34 and 39 are arranged in the peripheral edge 28 of the exhaust port 27. However, at least one of the pair of facing sheet parts 34 and 39 may be formed of the circumferential wall 21 itself. For example, in the peripheral edge 28 of the exhaust port 27 of the circumferential wall 21, in a case where the front edge 28*a* side and the rear edge 28*b* side of the exhaust port 27 are formed of a separate airbag basic fabric, the facing sheet parts 34 and 39 may be formed to extend from a portion of the airbag basic fabric.

In the embodiment, a configuration is exemplified in which the internal pressure adjusting mechanism 30 is arranged in the airbag 19 of the passenger seat airbag device M so that the inflation is completed rapidly with respect to the occupant PP arranged properly, and the inflation gas G is exhausted so that the inflation does not proceed with respect to the adjacent occupant IP. However, an airbag of another driver seat airbag device or an airbag of a knee protection airbag device may be provided with the internal pressure adjusting mechanism 30 of the invention together with the exhaust port.

As described in the invention, in a configuration in which the exhaust port and the internal pressure adjusting mechanism are provided in the bag part, in a case where the airbag is formed as a double-structure with an inner bag and an outer bag covering the inner bag, the invention may be implemented in a such a manner that in the portion where the inflation gas flows from the inner bag to the outer bag, the exhaust port and the internal pressure adjusting mechanism are provided with respect to the inner bag as the bag part, or the exhaust port and the internal pressure adjusting mechanism are provided with respect to the outer bag. Of course, in a case where the airbag is configured by connecting a plurality of bag parts to be partitioned by a partition wall having a communicating port as the exhaust port, the invention may be implemented in a such a manner that the internal pressure adjusting mechanism of the invention is provided together with the tether in the communicating port (exhaust port) of a predetermined bag part.

As described in the embodiment, in a case where two tethers 32 and 55 are used with respect to the pair of facing sheet parts 34 and 39, at least one of the length dimensions LM and LS may be changed to adjust the exhaust amount of the inflation gas G of the exhaust mode EM, or a predetermined amount of inflation gas G may be exhausted in the exhaust suppression mode RM.

The opening (auxiliary exhaust port) which allows the inflation gas G to be exhausted may be provided in the portion of the root side part 48 or the facing edge part 41 of the extending sheet part 43 of the long side part 39 which surrounds the short side part 34 in the exhaust suppression mode RM, so as to exhaust a predetermined amount of inflation gas G as an exhaust amount smaller than that at the time of fully opening the exhaust port 27.

According to an aspect of the invention, there is provided an airbag including: a bag part which includes a circumferential wall formed of a flexible sheet material, and which is configured to be inflated by a flowing inflation gas; an exhaust port which is open in the circumferential wall so as to exhaust the inflation gas from the bag part; and an internal pressure adjusting mechanism which includes a tether arranged in the bag part, the tether formed of a flexible member and having a tip extending from an attaching base part, the tip coupled with a vicinity of a peripheral edge of the exhaust port, wherein the internal pressure adjusting mechanism is configured to adjust an exhaust of the inflation gas: to be in an exhaust mode in which the exhaust of the inflation gas from the exhaust port is facilitated when the tether is loosened; and to be in an exhaust suppression mode in which the exhaust of the inflation gas from the exhaust port is suppressed when the tether is stretched, the internal pressure adjusting mechanism includes: a pair of facing sheet parts which are arranged to extend respectively from both edges which face each other in the peripheral edge of the exhaust port on an outer peripheral surface side of the bag part, and which are formed of a flexible member; and the tether, the pair of facing sheet parts include facing edge parts which extend from the peripheral edge of the exhaust port in a belt shape to face each other with the exhaust port interposed therebetween, one of the pair of facing sheet parts is a long side part which includes an extending sheet part that extends from the facing edge part to be separated from the peripheral edge of the exhaust port and that is coupled with the tether at a tip side, the other of the pair of facing sheet parts is a short side part which includes only the facing edge part and does not include the extending sheet part, the extending sheet part of the long side part includes a folded portion which extends from the facing edge part of the long side part to cover a terminal of the facing edge part of the short side part and to pass over the facing edge part of the short side part, and which is arrangeable to be folded back to a back surface side, which is opposite to the exhaust port side, of the facing edge part of the short side part, the folded portion includes: a leading edge side part which is arrangeable to contact the back surface side of the facing edge part of the short side part, and which is coupled with the tip of the tether; and a root side part which is provided with a reversed part between the leading edge side part and the root side part, and which is connected from the leading edge side part to an end part of the facing edge part of the long side part, the long side part and the short side part are coupled with each other in both edges in a direction perpendicular to a facing direction of the facing edge parts in a state where the folded portion is arranged on the back surface side of the facing edge part of the short side part and the facing edge parts are overlapped, and a length dimension of the tether is set in such a manner that: in a state where the tether is loosened during the exhaust mode of the internal pressure adjusting mechanism, the tip of the tether is coupled with the leading edge side part such that the folded portion of the long side part is arranged on a back surface side, which is opposite to the exhaust port side, of the facing edge part of the long side part and the facing edge parts of the long side part and the short side part are separable; and in a state where the tether is stretched during the exhaust suppression mode of the internal pressure adjusting mechanism, the leading edge side part is stretched such that the facing edge part of the long side part and the root side part of the folded portion are inflated around the facing edge part of the short side part and the leading edge side part of the long side part is capable of press-contacting the back surface side of the facing edge part of the short side part.

In the airbag according to an aspect of the invention, when the inflation gas flows in a state where the airbag is housed in a fold-up state in a predetermined housing portion, the bag part is inflated. At that time, in the internal pressure adjusting mechanism, if the tether remains loosened in the state of the exhaust mode from beginning of housing, the tether does not stretch the portion coupled with the tip of the tether, that is, the leading edge side part on the tip side of the extending sheet part of the long side part which is one of the pair of facing sheet parts in the peripheral edge of the exhaust port. Thus, the state of the exhaust mode can be maintained. That is, in the exhaust mode, the folded portion of the long side part of the pair of facing sheet parts is arranged on the back surface side, which is opposite to the exhaust port side, of the facing edge part of the long side part, and the facing edge parts are separable from each other. The inflation gas is exhausted outside the bag part from the exhaust port through between the separated facing edge parts of the pair of facing sheet parts.

Thereafter, when the bag part is inflated with high internal pressure by the flowing inflation gas, and then the tether becomes in a stretched state, the tether stretches the portion coupled with the tip, that is, the leading edge side part on the tip side of the extending sheet part of the long side part which is one of the pair of facing sheet parts in the peripheral edge of the exhaust port. Further, the leading edge side part of the long side part is stretched by the tether and enters into a space between the facing edge parts of the long side part and the short side part. However, the root side part of the folded portion between the facing edge part and the leading edge side part of the long side part receives a pressure of the inflation gas which is exhausted from a portion between the facing edge parts of the long side part and the short side part. At that time, the long side part and the short side part are in a coupled state at the peripheral edge of the exhaust port, in advance, the facing edge part of the short side part facing the facing edge part of the long side part is arranged between the facing edge part of the long side part and the root side part of the folded portion, and the leading edge side part reversed through the reversed part is arranged between the facing edge part and the root side part of the short side part. The reversed part is in the state of approaching to be closer to the circumferential wall of the bag part than the terminal of the facing edge part of the long side part, and four pieces of the facing edge parts of the long side part and the short side part, the leading edge side part, and the root side part are coupled overlappingly on both edge sides orthogonal to the direction in which the facing edge parts of the long side part and the short side part face each other. For this reason, when the root side part of the folded portion receives the pressure of the inflation gas exhausted from the exhaust port, the folded portion together with the reversed part is reversed with the vicinity of the tip (a boundary portion of the facing edge part and the extending sheet part) of the facing edge part of the long side part set as a center, so as to pass over the terminal (tip) of the facing edge part of the short side part from the back surface side of the facing edge part of the long side part and approach the circumferential wall of the bag part on the back surface side of the facing edge part of the short side part. Thus, the root side part returns to the coupled state (which is the coupled state of the folded portion and is a state where the root side part is arranged on the back surface side of the facing edge part of the short side part, the reversed leading edge side part is arranged between the root side part and the facing edge part of the short side part, and the reversed part is allowed to approach to be closer to the circumferential wall side of the bag part than the terminal of the facing edge part of the long side part).

In the reversed state, the facing edge part of the long side part covers the exhaust port side of the facing edge part of the short side part, the root side part of the extending sheet part covers the tip side of the facing edge part of the short side part, and the back surface side of the facing edge part of the short side part is covered by the pressure of the inflation gas flowing in between the root side part and the leading edge side part with the leading edge side part which press-contacts the facing edge part of the short side part with high sealability, thereby closing the exhaust port. In addition, in both edge sides (both edge sides in a direction perpendicular to the direction in which the facing edge parts face each other) which are not provided in the facing edge parts of the exhaust port, the facing edge part of the short side part, the facing edge part of the long side part, the root side part, and the leading edge side part are coupled with each other, and thus the leakage of the inflation gas does not occur. With such an exhaust suppression state, the wrinkle hardly occurs and the gap can be lessened compared to a case where the tube portion in the related art is gathered to the center side to close the exhaust port. Thus, the leakage of the inflation gas can be suppressed stably.

In the close state of the exhaust port, the leading edge side part is allowed to approach the tip side of the facing edge part of the short side part by reversing the tip from the reversed part, the entire area of both edges from the reversed part to the tip are coupled with both edges of the facing edge part of the short side part, and thus a situation hardly occurs in which the tip of the leading edge side part passes over the terminal of the short side part to be turned up to the exhaust port side. Particularly, since the internal pressure of the bag part is received so that a portion of the leading edge side part allowed to press-contact the back surface side of the facing edge part of the short side part, further, the tip of the leading edge side part is hardly turned up, and the leakage of the inflation gas from the exhaust port does not occur. That is, in such a configuration, although the tether is loosened, when the internal pressure is applied to the bag part, the inflation gas is hardly exhausted from the exhaust port, so as to ensure the stable exhaust suppression mode.

Therefore, the airbag according to an aspect of the invention, a stable exhaust suppression state can be ensured during the exhaust suppression mode. In addition, the internal pressure adjusting mechanism is configured by the tether and the facing sheet parts both having flexibility. Thus, the internal pressure adjusting mechanism can be easily folded up together with the bag part, and the folding or the housing property of the airbag is not inhibited.

In the airbag, a tip of an auxiliary tether that is coupled with the attaching base part side of the tether may be coupled with the facing edge part of the short side part, and a length dimension of the auxiliary tether may be set in such a manner that: in a state where the auxiliary tether is stretched during the exhaust suppression mode of the internal pressure adjusting mechanism, the facing edge part of the short side part is stretched such that the back surface side of the facing edge part of the short side part is capable of press-contacting the leading edge side part of the long side part and inflation to the leading edge side part side is regulated; and in a state where the auxiliary tether is loosened during the exhaust mode of the internal pressure adjusting mechanism, the tip of the auxiliary tether is coupled with the facing edge part of the short side part such that the facing edge part of the short side part is separable from the facing edge part of the long side part.

With such a configuration, the auxiliary tether can prevent that the facing edge part of the short side part is turned up unintentionally during the inflation of the bag part, and the exhaust mode can be smoothly shifted to the exhaust suppression mode. That is, when the bag part is inflated so that the main tether coupled with the leading edge side part of the long side part is stretched, and a mode shift is performed to the exhaust suppression mode, the auxiliary tether stretches the facing edge part of the short side part to prevent an unintentional turn-up. That is, the airbag is not inflated such that the terminal side of the facing edge part of the short side part is not separated from the exhaust port. For this reason, when the folded portion is reversed from the back surface side of the facing edge part of the long side part to the back surface side of the facing edge part of the short side part, the tip of the leading edge side part of the folded portion does not enter into the exhaust port in the facing edge part of the short side part, and is smoothly reversed to the back surface of the facing edge part of the short side part. As a result, the folded portion is smoothly reversed to the back surface side of the facing edge part of the short side part, and in the internal pressure adjusting mechanism, the exhaust mode can be smoothly shifted to the exhaust suppression mode.

In the airbag, the exhaust port may have a substantially vertically-long rectangular opening shape in which the both edges provided with the facing edge parts of the pair of facing sheet parts in the peripheral edge are lengthened compared to both edges orthogonal to the facing direction of the facing edge part and are formed in a linear shape.

With such a configuration, in the pair of facing sheet parts, the root parts of the facing edge parts of the peripheral edge of the exhaust port can be arranged in the linear shape along the edges of the exhaust port, respectively. Thus, although the portion of the facing edge part of the short side part which the leading edge side part press-contacts during the exhaust suppression mode is arranged to approach the circumferential wall side of the bag part, the leading edge side part and the facing edge part of the short side part can be stably press-contacted with each other in a planar shape with high sealability. That is, the length dimension that extends from the peripheral edge of the exhaust port of the facing edge part can be shortened, and the pair of facing sheet parts can be formed without a bulky shape. Incidentally, when the exhaust port is open in a circular shape or a long circular shape, the edge in which the facing sheet parts are arranged is formed in an arc shape. Thus, when the portions which press-contact with each other during the exhaust suppression mode are not provided to have a long distance from the peripheral edge of the exhaust port, the wrinkle occurs, and a flatness cannot be ensured so that the portions cannot press-contact each other. Further, in order that the wrinkle does not occur and the press contact is performed in the planar shape, the respective press-contact portions are necessarily provided to have a long distance from the exhaust port, and thus the length dimension that extends from the peripheral edge of the exhaust port of the facing edge part is lengthened. Therefore, the facing sheet parts become bulky, which is not preferable.

What is claimed is:
1. An airbag comprising:
a bag part which includes a circumferential wall formed of a flexible sheet material, and which is configured to be inflated by a flowing inflation gas;
an exhaust port which is open in the circumferential wall so as to exhaust the inflation gas from the bag part; and
an internal pressure adjusting mechanism which includes a tether arranged in the bag part, the tether formed of a flexible member and having a tip extending from an attaching base part, the tip coupled with a vicinity of a peripheral edge of the exhaust port, wherein
the internal pressure adjusting mechanism is configured to adjust an exhaust of the inflation gas: to be in an exhaust mode in which the exhaust of the inflation gas from the exhaust port is facilitated when the tether is loosened; and to be in an exhaust suppression mode in which the exhaust of the inflation gas from the exhaust port is suppressed when the tether is stretched, the internal pressure adjusting mechanism includes: a pair of facing sheet parts which are arranged to extend respectively from both edges which face each other in the peripheral edge of the exhaust port on an outer peripheral surface side of the bag part, and which are formed of a flexible member; and the tether, the pair of facing sheet parts include facing edge parts which extend from the peripheral edge of the exhaust port in a belt shape to face each other with the exhaust port interposed therebetween, one of the pair of facing sheet parts is a long side part which includes an extending sheet part that extends from the facing edge part to be separated from the peripheral edge of the exhaust port and that is coupled with the tether at a tip side, the other of the pair of facing sheet parts is a short side part which includes the facing edge part, the extending sheet part of the long side part includes a folded portion which extends from the facing edge part of the long side part to cover a terminal of the facing edge part of the short side part and to pass over the facing edge part of the short side part, and which is arrangeable to be folded back to a back surface side, which is opposite to an exhaust port side, of the facing edge part of the short side part, the folded portion includes: a leading edge side part which is arrangeable to contact the back surface side of the facing edge part of the short side part, and which is coupled with the tip of the tether; and a root side part which is provided with a reversed part between the leading edge side part and the root side part, and which is connected from the leading edge side part to an end part of the facing edge part of the long side part, the long side part and the short side part are coupled with each other in both edges in a direction perpendicular to a facing direction of the facing edge parts in a state where the folded portion is arranged on the back surface side of the facing edge part of the short side part and the facing edge parts are overlapped, and a length dimension of the tether is set in such a manner that:

in a state where the tether is loosened during the exhaust mode of the internal pressure adjusting mechanism, the tip of the tether is coupled with the leading edge side part such that the folded portion of the long side part is arranged on a back surface side, which is opposite to the exhaust port side, of the facing edge part of the long side part and the facing edge parts of the long side part and the short side part are separable; and in a state where the tether is stretched during the exhaust suppression mode of the internal pressure adjusting mechanism, the leading edge side part is stretched such that the facing edge part of the long side part and the root side part of the folded portion are inflated around the facing edge part of the short side part and the leading edge side part of the long side part is capable of press-contacting the back surface side of the facing edge part of the short side part.

2. The airbag according to claim 1, wherein a tip of an auxiliary tether that is coupled with an attaching base part side of the tether is coupled with the facing edge part of the short side part, and a length dimension of the auxiliary tether is set in such a manner that:

in a state where the auxiliary tether is stretched during the exhaust suppression mode of the internal pressure adjusting mechanism, the facing edge part of the short side part is stretched such that the back surface side of the facing edge part of the short side part is capable of press-contacting the leading edge side part of the long side part and inflation to a leading edge side part side of the long side part is regulated; and in a state where the auxiliary tether is loosened during the exhaust mode of the internal pressure adjusting mechanism, the tip of the auxiliary tether is coupled with the facing edge part of the short side part such that the facing edge part of the short side part is separable from the facing edge part of the long side part.

3. The airbag according to claim 1, wherein the exhaust port has a substantially vertically-long rectangular opening shape in which the both edges provided with the facing edge parts of the pair of facing sheet parts in the peripheral edge are lengthened compared to both edges orthogonal to the facing direction of the facing edge part and are formed in a linear shape.

* * * * *